United States Patent
Honjo et al.

(10) Patent No.: US 10,348,980 B2
(45) Date of Patent: Jul. 9, 2019

(54) IMAGING DEVICE

(71) Applicant: Panasonic Intellectual Property Management Co., Ltd., Osaka (JP)

(72) Inventors: Kenichi Honjo, Osaka (JP); Mitsuyoshi Okamoto, Osaka (JP); Yuuichi Kimura, Osaka (JP); Masatoshi Nakamura, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 93 days.

(21) Appl. No.: 15/696,342

(22) Filed: Sep. 6, 2017

(65) Prior Publication Data

US 2018/0084203 A1 Mar. 22, 2018

(30) Foreign Application Priority Data

Sep. 16, 2016 (JP) .................................. 2016-182355

(51) Int. Cl.
*H04N 5/262* (2006.01)
*H04N 5/232* (2006.01)
(Continued)

(52) U.S. Cl.
CPC ........... *H04N 5/2628* (2013.01); *G06T 5/003* (2013.01); *G06T 5/50* (2013.01); *G06T 7/571* (2017.01);
(Continued)

(58) Field of Classification Search
CPC ............. H04N 5/2628; H04N 5/23212; H04N 5/2356; H04N 5/23232; H04N 5/23264; G06T 5/003; G06T 5/50; G06T 7/571
(Continued)

(56) References Cited

U.S. PATENT DOCUMENTS 7,209,175 B1 * 4/2007 Kurokawa ............. H04N 5/232
348/345
9,948,848 B2 * 4/2018 Tokui ................. H04N 5/23212
348/349
(Continued)

FOREIGN PATENT DOCUMENTS

JP 2003-143461 5/2003
JP 2014-207502 10/2014
(Continued)

*Primary Examiner* — Marly S Camargo
(74) *Attorney, Agent, or Firm* — Renner, Otto, Boisselle & Sklar, LLP

(57) ABSTRACT

An imaging device includes: an imaging sensor; an optical system that changes an image magnification of a object image according to a position of a focus lens; and a controller that causes the imaging sensor to generate the plurality of pieces of image data by causing the imaging sensor to pick up the object image while moving the focus lens to generate still image data based on the plurality of pieces of image data. When generating the still image data, the controller finds an entrance pupil position of the optical system based on the position of the focus lens for each of the plurality of pieces of image data, and calculates an image magnification change rate indicating a change of the image magnification of the object image based on the found entrance pupil position, magnifies each of the plurality of pieces of image data such that a size of the object image indicated by each of the plurality of pieces of image data becomes a predetermined size, based on the corresponding image magnification change rate, and synthesizes the plurality of pieces of magnified image data to generate the still image data.

10 Claims, 25 Drawing Sheets

(51) Int. Cl.
- *H04N 5/235* (2006.01)
- *G06T 5/50* (2006.01)
- *G06T 7/571* (2017.01)
- *H04N 5/222* (2006.01)
- *G06T 5/00* (2006.01)

(52) U.S. Cl.
CPC ......... *H04N 5/2226* (2013.01); *H04N 5/2356* (2013.01); *H04N 5/23212* (2013.01); *H04N 5/23232* (2013.01); *H04N 5/23296* (2013.01); *G06T 2207/10016* (2013.01); *G06T 2207/10028* (2013.01); *G06T 2207/10148* (2013.01); *G06T 2207/20221* (2013.01)

(58) Field of Classification Search
USPC .......... 348/240.99, 240.1, 345, 220.1, 222.1, 348/208.13, 333.01, 333.09, 239; 382/255, 264
See application file for complete search history.

(56) References Cited

U.S. PATENT DOCUMENTS

| | | | |
|---|---|---|---|
| 2008/0309777 A1* | 12/2008 | Aoyama | G06K 9/40 382/255 |
| 2015/0350526 A1 | 12/2015 | Toyoda | |
| 2016/0028948 A1 | 1/2016 | Omori et al. | |
| 2016/0142618 A1 | 5/2016 | Tokui | |
| 2016/0344933 A1* | 11/2016 | Mukai | H04N 5/23293 348/221.1 |

FOREIGN PATENT DOCUMENTS

| | | |
|---|---|---|
| JP | 2015-015617 | 1/2015 |
| JP | 2015-231058 | 12/2015 |
| JP | 2015-231192 | 12/2015 |
| JP | 2016-005224 | 1/2016 |

* cited by examiner

FIG. 7A

In-focus information table 60A

| | In-focus lens position which is the closest to near side (Pnear) | In-focus position which is the closest to infinity side (Pfar) |
|---|---|---|
| a | 10 | 200 |

FIG. 7B

In-focus information table 60B

| | 1st AF region | 2nd AF region | 3rd AF region | ... | 19th AF region | ... | 49th AF region |
|---|---|---|---|---|---|---|---|
| b | Frame number | 5 | 43 | 36 | ... | | ... | 100 |
| c | Focus lens position (in-focus position) | 10 | 100 | 75 | ... | P | ... | 200 |

FIG. 17

| Focus lens position P | Distance I between imaging plane and entrance pupil position | Distance X between imaging plane and object plane | Lateral magnification β |
|---|---|---|---|
| P1 | I1 | X1 | β1 |
| P2 | I2 | X2 | β2 |
| P3 | I3 | X3 | β3 |
| . | . | . | . |
| . | . | . | . |
| . | . | . | . |
| Pj-1 | Ij-1 | Xj-1 | βj-1 |
| Pj | Ij | Xj | βj |
| Pj+1 | Ij+1 | Xj+1 | βj+1 |
| . | . | . | . |
| . | . | . | . |
| . | . | . | . |
| P200 | I200 | X200 | β200 |

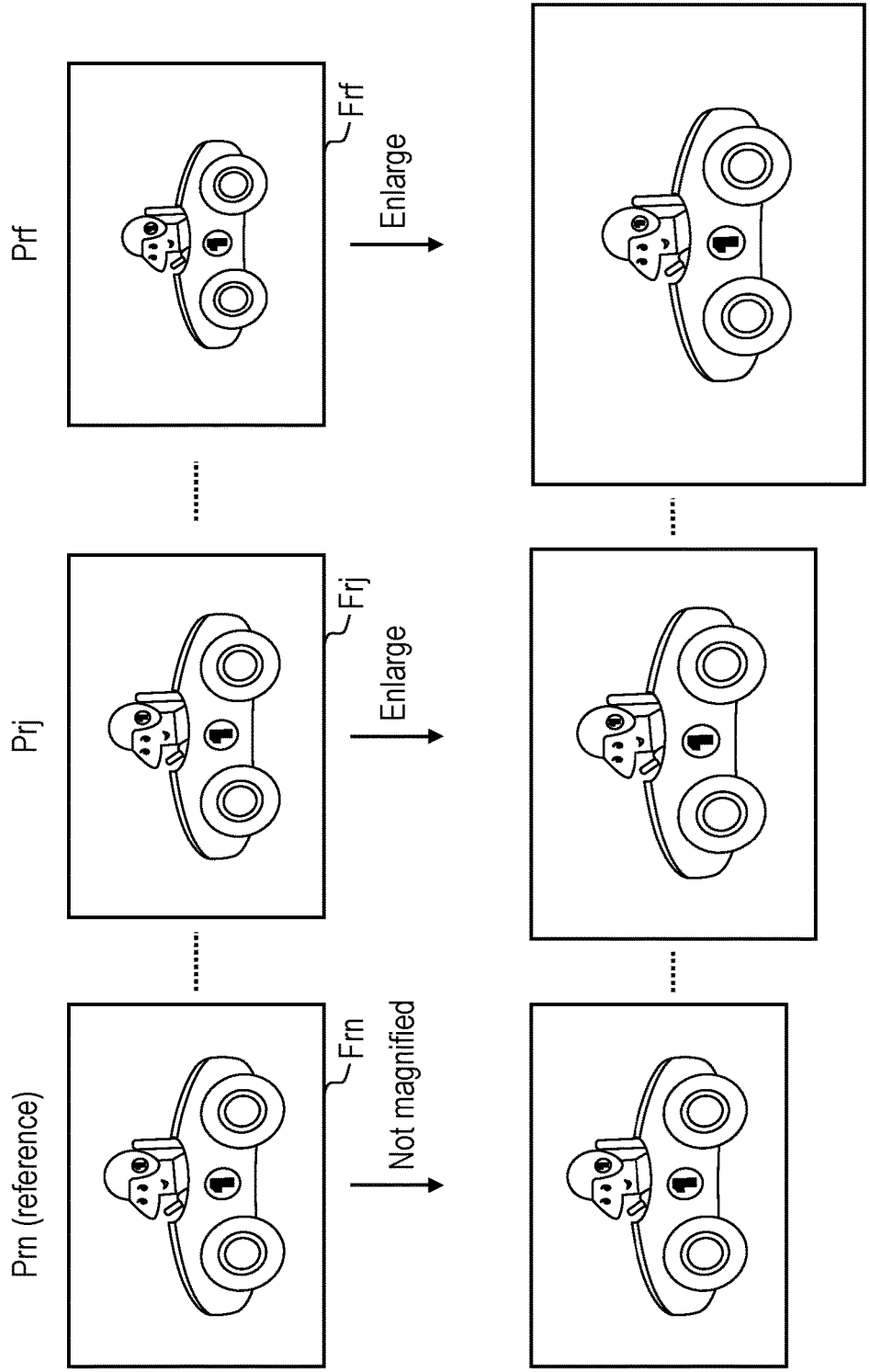

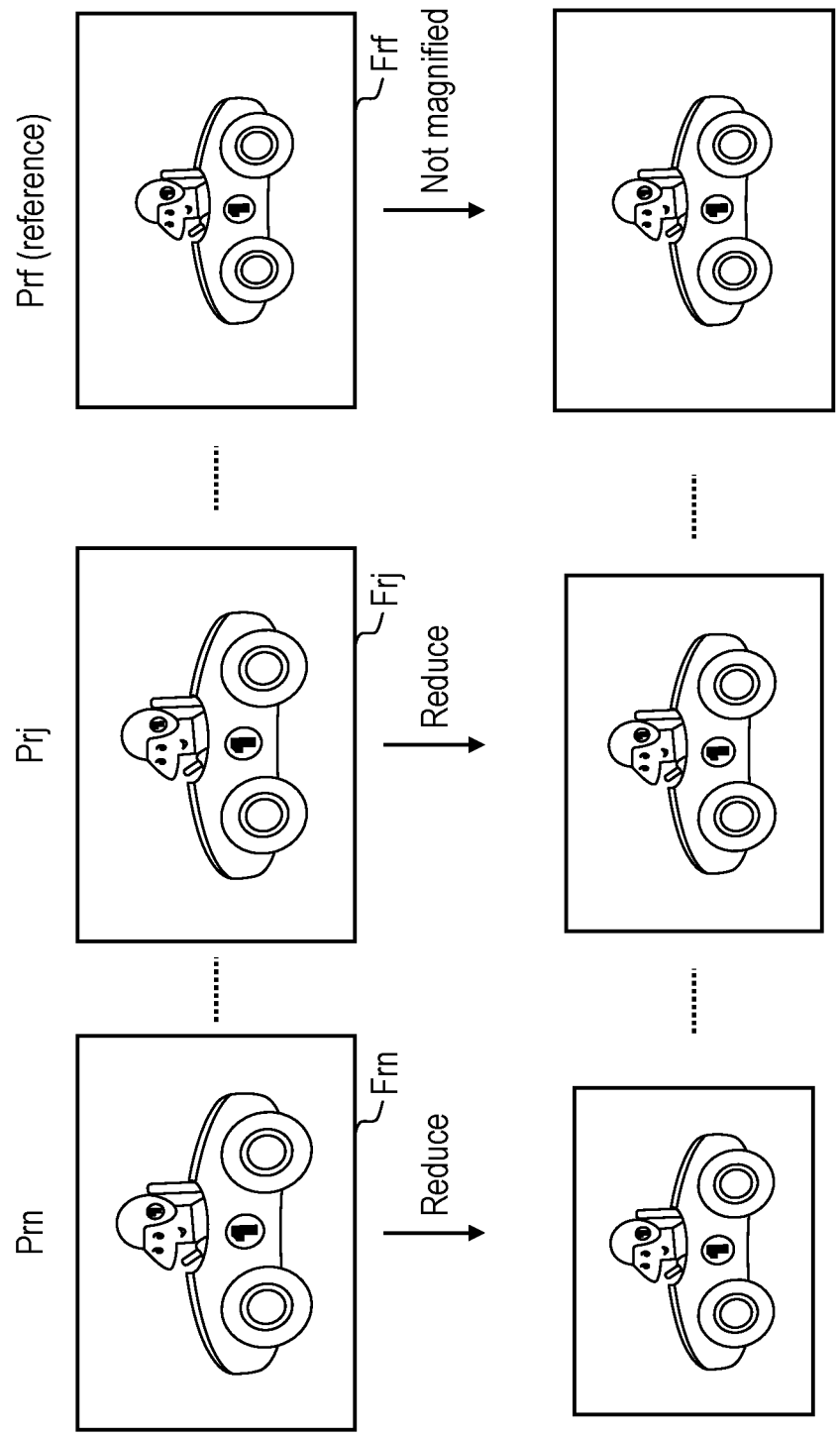

S1 (in-focus at Prn)  S2 (in-focus at Prf)

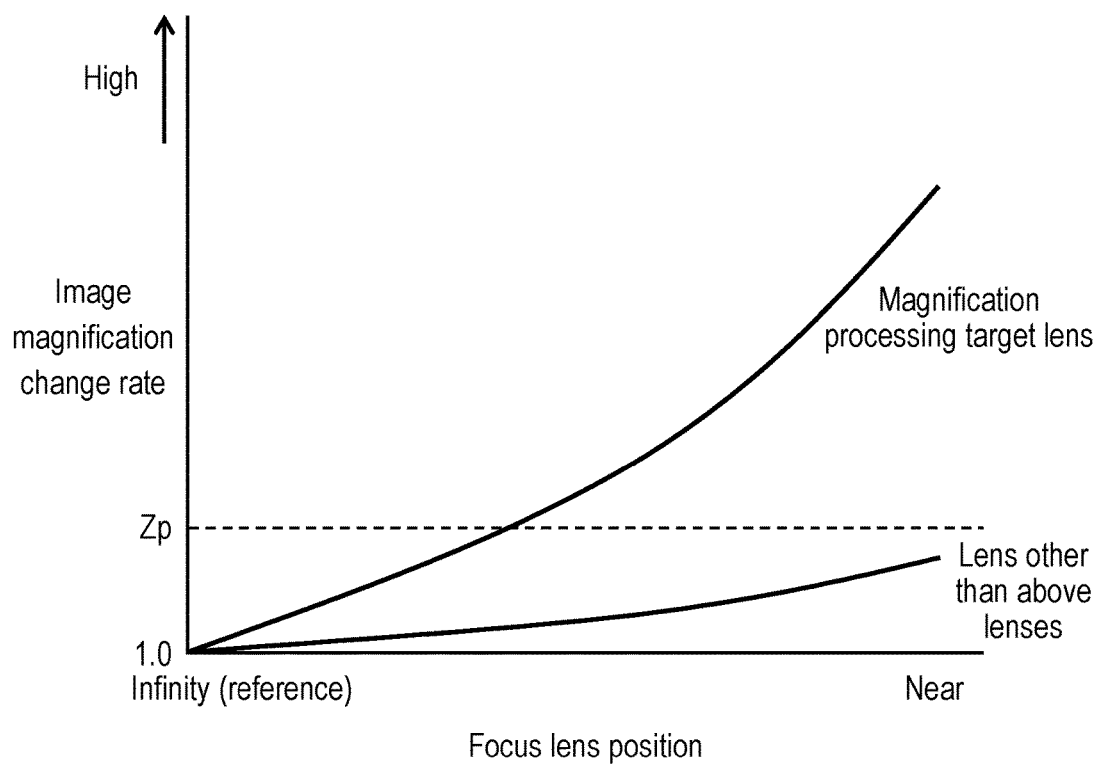

FIG. 24

For H-H003A

For H-H002A

For H-H001A

| Focus lens position P | Distance I between imaging plane and entrance pupil position | Distance X between imaging plane and object plane | Lateral magnification β |
|---|---|---|---|
| P1 | I1 | X1 | β1 |
| P2 | I2 | X2 | β2 |
| P3 | I3 | X3 | β3 |
| ... | ... | ... | ... |
| Pj-1 | Ij-1 | Xj-1 | βj-1 |
| Pj | Ij | Xj | βj |
| Pj+1 | Ij+1 | Xj+1 | βj+1 |
| ... | ... | ... | ... |
| P200 | I200 | X200 | β200 |

IMAGING DEVICE

BACKGROUND

1. Technical Field

The present disclosure relates to an imaging device that includes a function of synthesizing a plurality of images and generating an image of a deep depth of field.

2. Description of Related Art

Unexamined Japanese Patent Publication No. 2014-207502 discloses an imaging device that picks up a plurality of images of varying focuses, and generates an image of a depth of field enlarged compared to the picked-up images from the plurality of images. An operator selects a plurality of objects (subjects) which is desired to be focused, and the imaging device according to Unexamined Japanese Patent Publication No. 2014-207502 picks up an image based on focus positions of the objects (subjects) selected by the operator. Consequently, it is possible to obtain a synthesis image which is focused on the focus position matching the operator's intention.

SUMMARY

An imaging device of the present disclosure includes: an imaging sensor that includes an imaging plane, picks up a object image and generates a plurality of pieces of image data; an optical system that includes a focus lens movable along an optical axis, is configured to form the object image on the imaging plane, and changes an image magnification of the object image formed on the imaging plane according to a position of the focus lens; and a controller that causes the imaging sensor to generate the plurality of pieces of image data by causing the imaging sensor to pick up the object image while moving the focus lens to generate still image data greater in a depth of field than the plurality of pieces of image data based on the plurality of pieces of image data. When generating the still image data, the controller finds an entrance pupil position of the optical system based on the position of the focus lens for each of the plurality of pieces of image data to calculate an image magnification change rate indicating a change of the image magnification of the object image based on the found entrance pupil position, magnifies each of the plurality of pieces of image data such that a size of the object image indicated by each of the plurality of pieces of image data becomes a predetermined size, based on the corresponding image magnification change rate, and synthesizes the plurality of pieces of magnified image data to generates the still image data.

Further, an imaging device according to the present disclosure includes: an imaging sensor that includes an imaging plane, picks up a object image and generates a plurality of pieces of image data; an optical system that includes a focus lens movable along an optical axis, is configured to form the object image on the imaging plane, and changes an image magnification of the object image formed on the imaging plane according to a position of the focus lens; and a controller that causes the imaging sensor to generate the plurality of pieces of image data by causing the imaging sensor to pick up the object image while moving the focus lens to generate still image data greater in a depth of field than the plurality of pieces of image data based on the plurality of pieces of image data. When generating the still image data, the controller calculates an angle of view of the optical system based on the position of the focus lens for each of the plurality of pieces of image data to calculate an image magnification change rate indicating a change of the image magnification of the object image based on the calculated angle of view, magnifies each of the plurality of pieces of image data such that a size of the object image indicated by each of the plurality of pieces of image data becomes a predetermined size, based on the corresponding image magnification change rate, and synthesizes the plurality of pieces of magnified image data to generate the still image data.

Even when an image magnification of a object image formed on the imaging plane changes with a focus lens position of each optical system being changed, the imaging device of the present disclosure can generate a synthesis image of high quality and a deeper depth of field.

BRIEF DESCRIPTION OF DRAWINGS

FIG. 7A is a view illustrating an example of an in-focus information table;

FIG. 7B is a view illustrating an example of the in-focus information table;

FIG. 17 is a view illustrating an example of an image magnification change rate calculation information table;

FIG. 18B is a view for explaining magnification of a frame image in an enlargement direction;

FIG. 18C is a view for explaining magnification of a frame image in a reduction direction;

FIG. 21 is a view for explaining that an image magnification change rate differs according to a lens type;

FIG. 22 is a view illustrating an example of a magnification processing target lens table;

FIG. 24 is a view illustrating an example of an image magnification change rate calculation information table according to the third exemplary embodiment.

DETAILED DESCRIPTION

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding by those skilled in the art. Note that the attached drawings and the following description are provided for those skilled in the art to fully understand the present disclosure, and are not intended to limit the subject matter as described in the appended claims.

The exemplary embodiments of an imaging device of the present disclosure will be described below.

First Exemplary Embodiment

1. Configuration of Digital Camera

Figure 1:
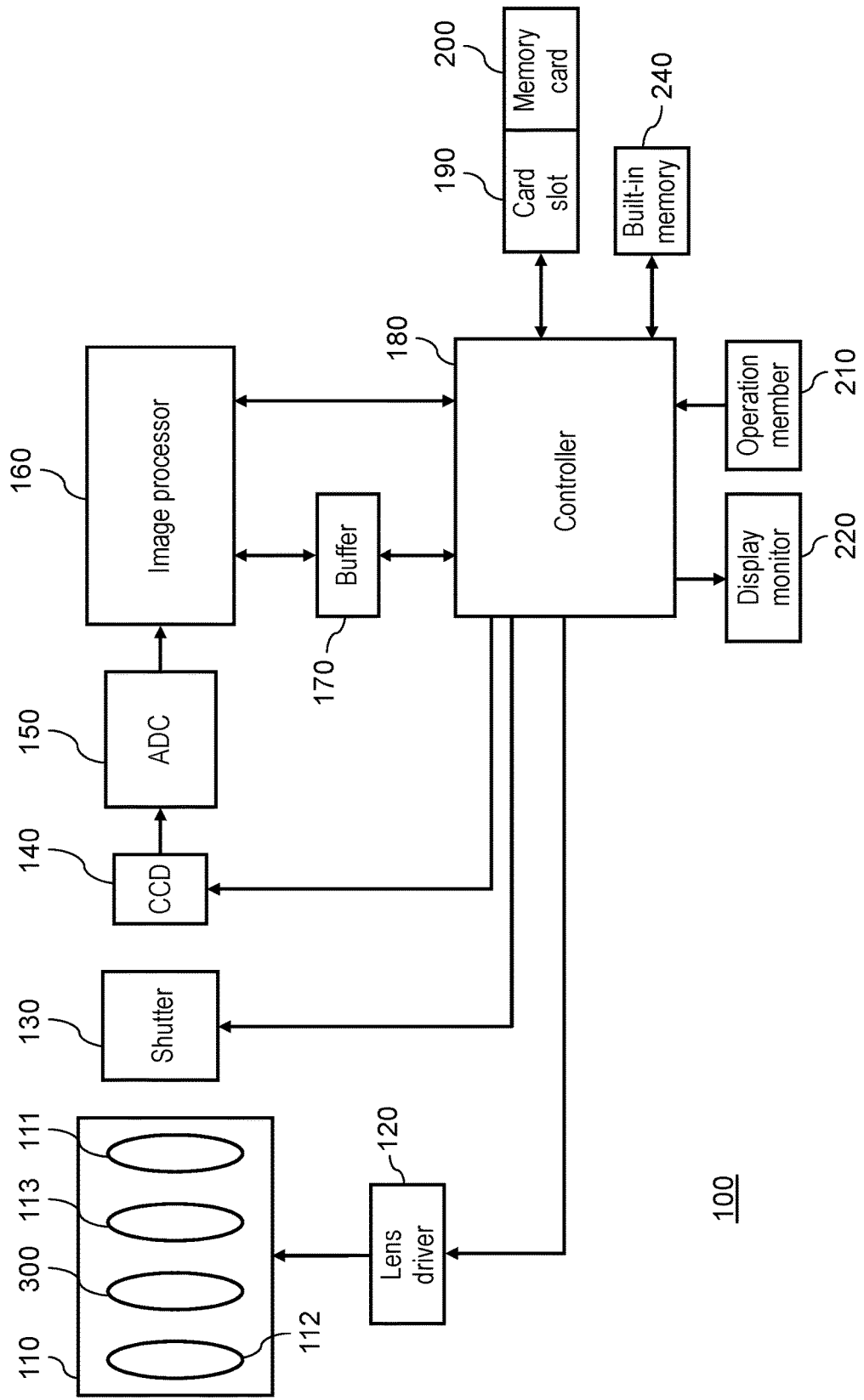
FIG. 1 is a view illustrating a configuration of a digital camera according to a first exemplary embodiment.

An electrical configuration of a digital camera (an example of an imaging device) according to a first exemplary embodiment will be described with reference to FIG. 1. FIG. 1 is a block diagram illustrating a configuration of digital camera 100. Digital camera 100 is an imaging device that picks up a object image formed by optical system 110 including one or a plurality of lenses by using charge coupled device (CCD) 140 as an imaging sensor. Image data generated by the CCD 140 is subjected to various types of processing by image processor 160, and is stored in memory card 200. A configuration of digital camera 100 will be described in detail below.

Optical system 110 includes zoom lens 112, image blur correction lens 113, focus lens 111 and diaphragm 300. Diaphragm 300 adjusts a size of an aperture according to a user's setting or automatically, and adjusts the amount of light transmitting through the aperture, and a depth of field. Further, the object image can be enlarged or reduced by moving zoom lens 112 along an optical axis. Furthermore, a focus (an in-focus state) of the object image can be adjusted by moving focus lens 111 along the optical axis. Still further, image blur correction lens 113 corrects blurring of an image of digital camera 100.

Lens driver 120 drives various optical members (e.g., zoom lens 112, focus lens 111 and diaphragm 300) included in optical system 110. Lens driver 120 includes, for example, a zoom motor that drives zoom lens 112, a focus motor that drives focus lens 111, and a diaphragm motor that controls a light amount of the aperture of diaphragm 300.

Shutter 130 is means for shielding light to be transmitted to CCD 140. Shutter 130 controls optical information indicating the object image with optical system 110 and diaphragm 300. Further, optical system 110 and diaphragm 300 are housed in a lens barrel.

CCD 140 picks up the object image formed by optical system 110, and generates image data. CCD 140 includes a color filter, a light receiving element and an auto gain controller (AGC). The light receiving element converts an optical signal condensed by optical system 110 into an electrical signal, and generates image information. The AGC amplifies the electrical signal output from the light receiving element.

Analog-digital converter (A/D converter: ADC) 150 converts analog image data generated by CCD 140 into digital image data.

Image processor 160 performs various types of processing on digital image data generated and converted by CCD 140 under control of controller 180. Image processor 160 generates image data to be displayed on display monitor 220, and generates image data stored in memory card 200. For example, image processor 160 performs various types of processing such as Gamma correction, white balance correction and damage correction, on image data generated by CCD 140. Further, image processor 160 compresses the image data generated by CCD 140 according to a compression format which complies with 11.264 standards or MPEG2 standards. Furthermore, image processor 160 can generate image data (4K moving image data) of moving images of approximately 4000×2000 pixels, for example, based on the image data generated by CCD 140. Image processor 160 can perform various types of processing described below on the generated 4K moving image data. For example, image processor 160 performs depth synthesis (focus stacking) processing by using frame images which configure the generated 4K moving image data (details will be described below).

Controller 180 is a control unit that entirely controls entire digital camera 100. Controller 180 can be realized by a semiconductor element.

Image processor 160 and controller 180 may be configured by only hardware or may be realized by a combination of hardware and software. Controller 180 can be realized by a micro-controller, a central processing unit (CPU), a micro processing unit (MPU), a digital signal processor (DSP), an application specific integrated circuit (ASIC), and a field-programmable gate array (FPGA).

Buffer 170 functions as a work memory of image processor 160 and controller 180. Buffer 170 can be realized by, for example, a dynamic random access memory (DRAM) or a ferroelectric memory.

Card slot 190 is a unit that attaches memory card 200 to digital camera 100. Card slot 190 can mechanically and electrically connect memory card 200 and digital camera 100.

Memory card 200 includes a flash memory or the ferroelectric memory inside, and can store data such as image files generated by image processor 160.

A flash memory or a ferroelectric memory is used to configure built-in memory 240. Built-in memory 240 stores a control program for controlling entire digital camera 100, and data.

Operation member 210 is a generic term of a user interface that receives a user's operation. Operation member 210 includes a button that receives the user's operation, a lever, a dial, a touch panel and a switch. Further, operation member 210 includes a focus ring disposed on an outer circumference of the lens barrel. The focus ring is a member that is operated to rotate by the user to move focus lens 111.

Display monitor 220 can display an image (a through image) indicated by the image data generated by CCD 140 or an image indicated by image data read from memory card 200. Further, display monitor 220 can display various menu screens for making various settings of digital camera 100. Display monitor 220 is configured by a liquid crystal device or an organic electro luminescence (EL) display device.

Figure 2:
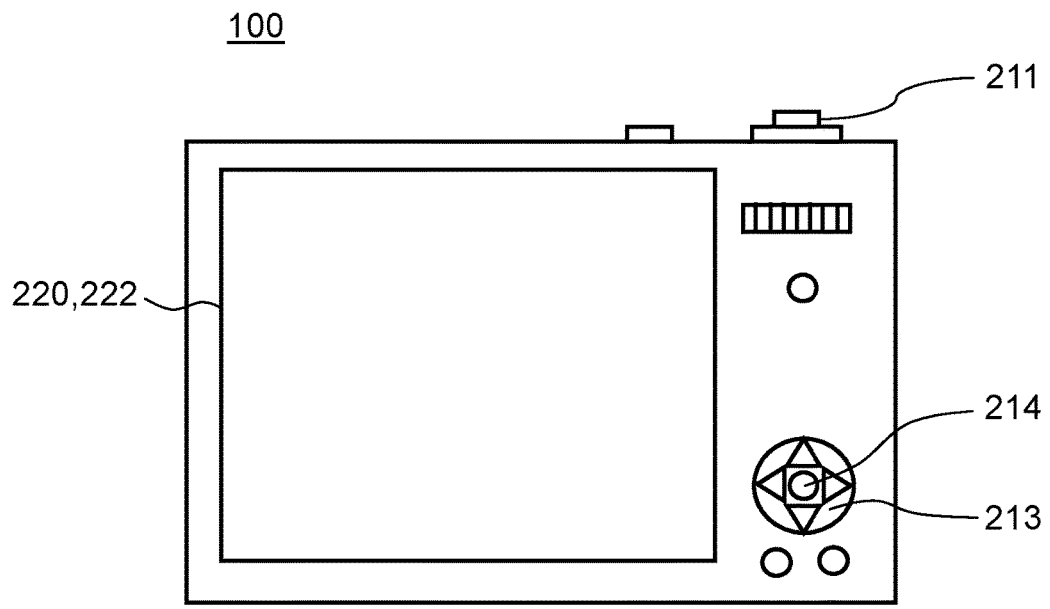
FIG. 2 is a back view of the digital camera.

FIG. 2 is a view illustrating a back surface of digital camera 100. FIG. 2 illustrates release button 211, selection buttons 213, determination button 214 and touch panel 222 as an example of operation member 210. When receiving a user's operation, operation member 210 transmits various instruction signals to controller 180.

Release button 211 is a two-stage pressing-type push button. When the user press release button 211 halfway down, controller 180 executes autofocus control (AF control) and auto exposure control (AE control). Further, when the user presses release button 211 fully down, controller 180 records image data picked up at a timing of a pressing operation as a recording image in memory card 200.

Selection buttons 213 are pressing buttons disposed in upper, lower left and right directions. By pressing one selection button 213 in one of the upper, lower, left and right directions, the user can move a cursor or a frame described below or select various condition items displayed on display monitor 220.

Determination button 214 is a pressing-type button. When digital camera 100 is in a shooting mode or a playback mode, and when the user presses determination button 214, controller 180 displays a menu screen on display monitor 220. The menu screen is a screen for setting various conditions for shooting and playback. When determination button 214 is pressed while setting items of various conditions are selected, controller 180 determines the setting of the selected item.

Touch panel 222 is overlaid and disposed on a display screen of display monitor 220 and detects a touch operation on a display screen performed by a user's finger. Thus, the user can perform an operator for designating a region on an image displayed on display monitor 220.

2. Operation

An operation of digital camera 100 employing the above configuration will be described. Digital camera 100 includes a depth synthesis (focus stacking) function. The depth synthesis function is a function of synthesizing a plurality of images shot at different in-focus positions, and generating one still image having a pseudo deeper depth of field. The depth synthesis operation which uses the depth synthesis function of digital camera 100 will be described below.

2-1. Depth Synthesis

Figure 3:
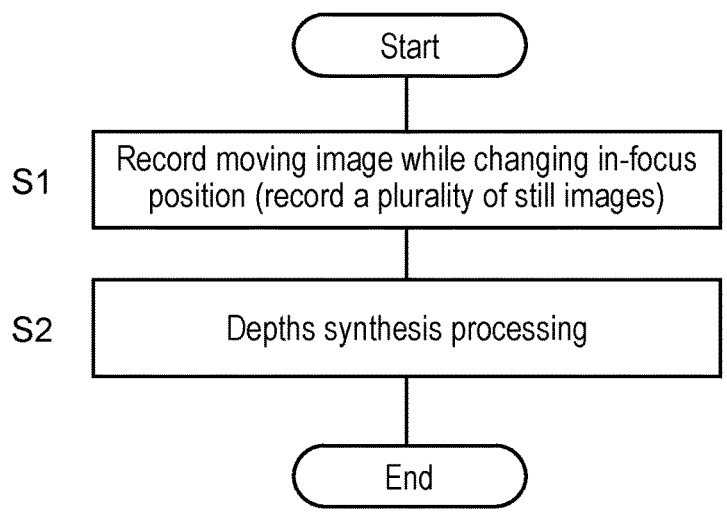
FIG. 3 is a flowchart illustrating a flow of processing of performing depth synthesis processing.

FIG. 3 is a view for explaining a flow of processing of executing the depth synthesis operation of digital camera 100. Digital camera 100 performs processing of recording moving images while changing an in-focus position to obtain a plurality of still images used for depth synthesis (S1). That is, controller 180 of digital camera 100 causes CCD 140 to pick up images and generate moving image data while moving focus lens 111 along the optical axis. Subsequently, digital camera 100 executes the depth synthesis processing (S2) by using frame images (still images) included in the recorded moving images, and generates still images of a deeper depth of field. In this regard, the depth synthesis processing (S2) may be continuously executed subsequently to moving image recording processing (S1) or may be executed at any timing after the moving image recording processing (S1) is completed.

2-1-1. Recording of Moving Image for Depth Synthesis

The recording processing (S1) of the moving images used for the depth synthesis will be described with reference to FIGS. 4 to 7A and 7B. According to this processing, moving images are recorded while an in-focus position is continuously changed to obtain a plurality of still images (frame images) having different in-focus positions. A moving image recorded in this way will be referred to as a "multifocus moving image". Digital camera 100 has a specific shooting mode for recording this multifocus moving image. The user can set digital camera 100 to this specific shooting mode by, for example, operating a menu or an operation dial.

The multifocus moving image is a moving image recorded while an in-focus position is continuously changed. As the multifocus moving image, a 4K moving image of high resolution having approximately 4000×2000 pixels is recorded. Depth synthesis processing is executed by using a plurality of frame images selected based on user's designation in frame images which configure these 4K moving images. Images subjected to the depth synthesis in this way are based on the 4K moving images and therefore have high image quality.

Figure 4:
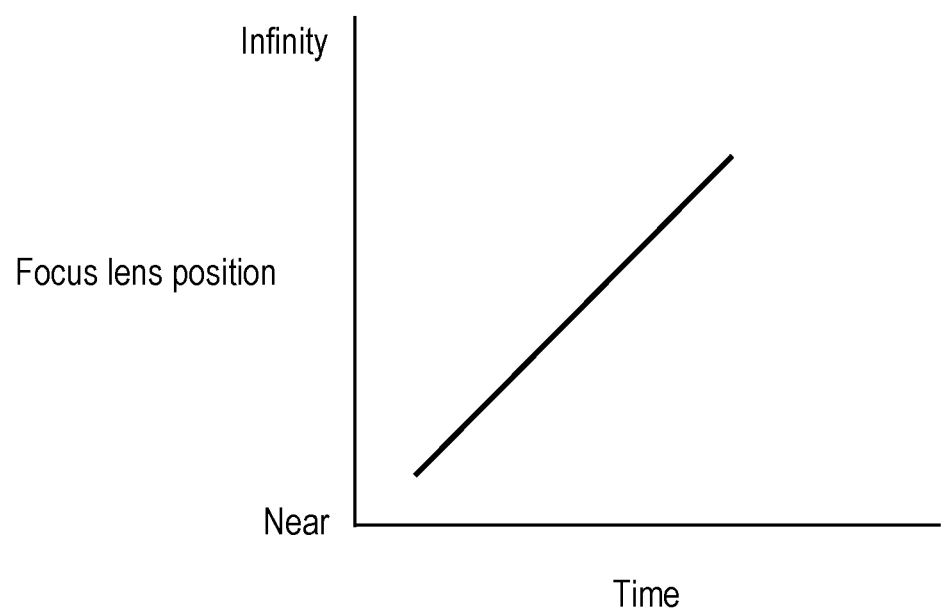
FIG. 4 is a view for explaining movement of a focus lens during recording of a multifocus moving image.
Figure 5:
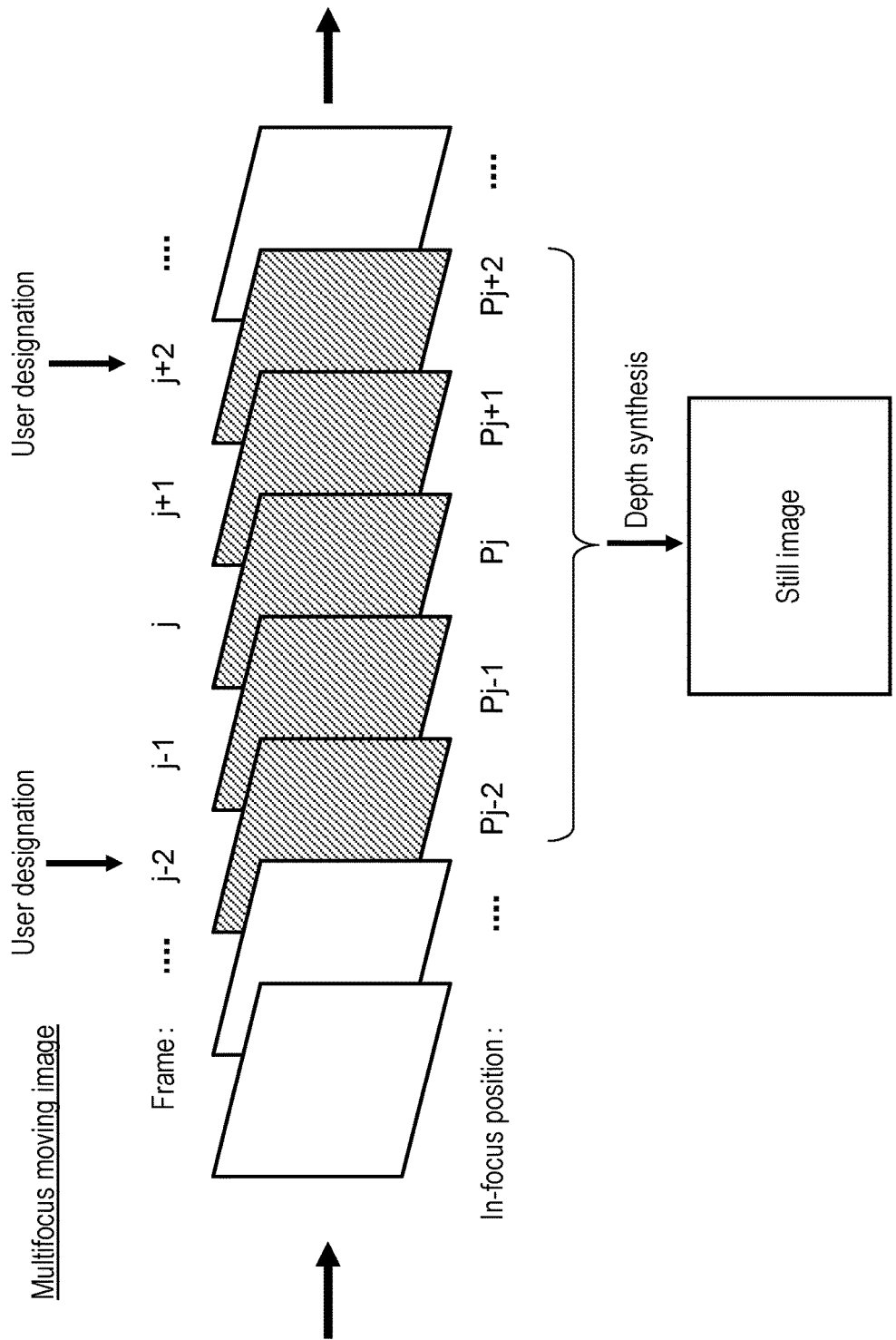
FIG. 5 is a view for explaining a concept of depth synthesis which uses a frame image of a multifocus moving image.

A multifocus moving image is recorded by shooting moving images while focus lens 111 is being moved from a near side to an infinity side (or vice versa) as illustrated in FIG. 4, i.e., while an in-focus position is being changed. The multifocus moving images recorded in this way include a plurality of frame images Pn recorded at different in-focus positions as illustrated in FIG. 5. According to the depth synthesis processing, the user selects and synthesizes a frame image (a hatched image in FIG. 5) corresponding to a object(subject) range designated by the user from a plurality of frame images Pn shot in this way (details will be described below). In this regard, digital camera 100 according to the first exemplary embodiment sets a range in which focus lens 111 can be actually driven, to a range between a focus lens position (a near end) which is a near side limit and a focus lens position (an infinity end) which is an infinity side limit.

Figure 6:
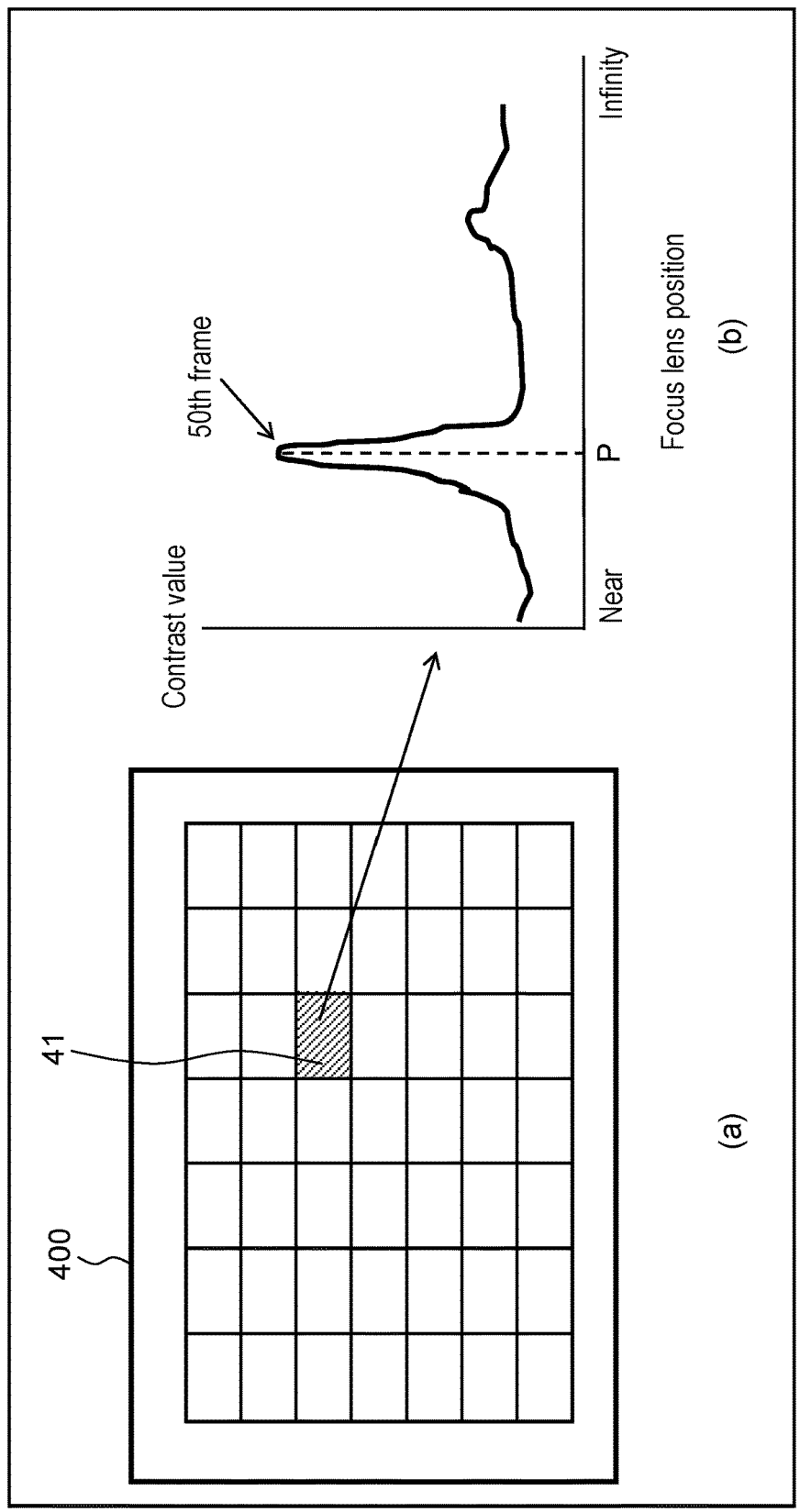
FIG. 6 is a view for explaining a change in a contrast value accompanied by movement of the focus lens in a plurality of AF regions set to an image region and one AF region.

Digital camera 100 according to the first exemplary embodiment sets a plurality of AF (Auto Focus) regions in image region 400 as illustrated in part (a) of FIG. 6 for an autofocus operation. In the first exemplary embodiment, 49 (seven rows×seven columns) AF regions are set. Per AF region, a frame (referred to as a focus frame) which focuses on a object in each AF region is obtained, and information related to the obtained focus frame is recorded in the in-focus information table. Digital camera 100 performs a focus search operation before recording (shooting) the multifocus moving images, detects an in-focus frame of each AF region and generates the in-focus information table.

FIGS. 7A and 7B are views illustrating data structures of an in-focus information table. In-focus information table 60A and in-focus information table 60B include information indicating a drive range of focus lens 111 in the focus search operation and a moving image recording operation. More specifically, in-focus information table 60A stores information (nearest in-focus lens position information) indicating a focus lens position (Pnear) which is the closest to the nearest side and at which in-focus is achieved, and information (farthest in-focus lens position information) indicating a focus lens position (Pfar) which is the closest to the farthest infinity side and at which in-focus is achieved as the information indicating the drive range of the focus lens 111. Further, in-focus information table 60B associates and manages, for each AF region, an in-focus position (the position of focus lens 111 when in-focus is achieved in each AF region) with respect to each AF region, and a frame number of a frame having an in-focus state in each AF region.

For example, a contrast value is calculated per AF region while focus lens 111 is moved. In this case, when a peak of the contrast value is detected at focus lens position P as illustrated in part (b) of FIG. 6 for 19th AF region 41 illustrated in part (a) of FIG. 6, a frame (a 50th frame in this case) shot at this focus lens position P is an in-focus frame with respect to 19th AF region 41. Further, in in-focus information table 60B, "50" is recorded as a frame number of an in-focus frame, and "P" is recorded as the position of focus lens 111. In-focus information table 60A and in-focus information table 60B are stored in a header of moving image data obtained by, for example, moving image shooting.

Details of the recording processing (S1) of the moving images used for depth synthesis will be described with reference to a flowchart of FIG. 8.

When a desired angle of view is set by operating zoom lens 112 in a state where a specific shooting mode for recording multifocus moving images is set in digital camera 100, and then the user presses release button 211 halfway down (YES in S11), controller 180 detects an in-focus position of each AF region of each image, and performs focus search for creating in-focus information table 60A and in-focus information table 60B (S12).

According to the focus search, controller 180 detects a contrast value per AF region while moving focus lens 111 from the near end to the infinity end (or vice versa) (see parts (a) and (b) of FIG. 6).

Further, controller 180 creates in-focus information table 60B based on the detected contrast value. More specifically, when moving focus lens 111 from the near end to the infinity end, controller 180 finds a position of focus lens 111 at which the contrast value maximizes among a plurality of images per AF region (see part (b) in FIG. 6), and records this position of focus lens 111 in in-focus information table 60B (see row c in FIG. 7B). When the contrast value of each image is lower than a predetermined threshold in one AF region, an in-focus position is not determined in this AF region. Therefore, a predetermined value indicating that the in-focus position is unclear is recorded in in-focus information table 60B.

Controller 180 performs the focus search on the entire range from the near end to the infinity end, and then records the focus lens position (Pnear) which is the closest to the near end and the focus lens position (Pfar) which is the closest to the infinity end among in-focus positions in each AF region obtained when focus lens 111 is moved from the near end to the infinity end as nearest in-focus lens position information and farthest in-focus lens position information in-focus information table 60A (see row a in FIG. 7A). Thus, the focus search is finished. In this state, in-focus information table 60B does not yet include frame number information.

After finishing the focus search, controller 180 decides whether the user continues pressing release button 211 halfway down (S13).

When the user does not press release button 211 halfway down after the focus search is finished (YES in S13), controller 180 returns processing to step S11. Consequently, the user can retry the focus search.

When the user continues pressing release button 211 halfway down after the focus search is finished (YES in S13), controller 180 decides whether the user has subsequently pressed release button 211 fully down (S14).

Subsequently, when the user subsequently presses release button 211 fully down (YES in S14), controller 180 starts a moving image recording operation of recording the multifocus moving images (S15).

Figure 9:
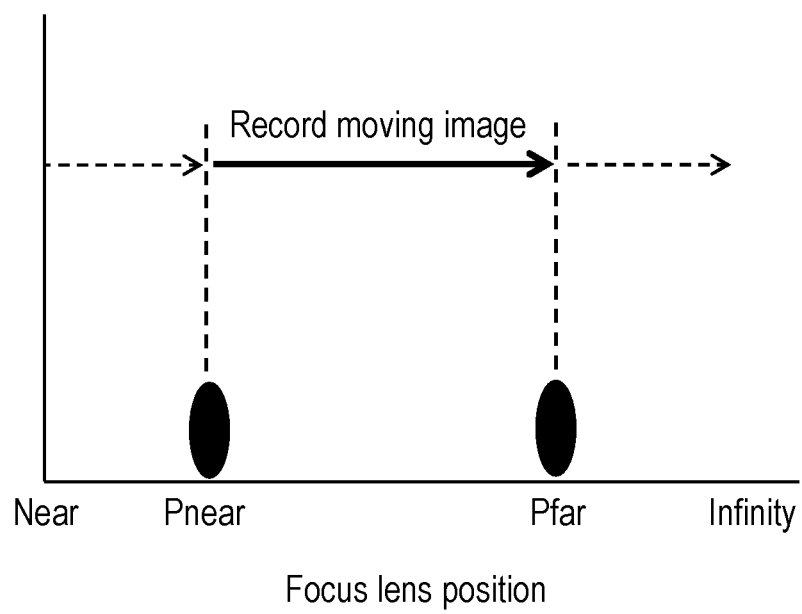
FIG. 9 is a view for explaining a movement range of the focus lens during recording of a multifocus moving image.

That is, controller 180 returns focus lens 111 to the focus lens position (Pnear) which is closest to the near side, and records moving images (multifocus moving images) while moving focus lens 111 to the focus lens position (Pfar) which is the closest to the infinity side as illustrated in FIG. 9 (S15). By limiting a movement range of focus lens 111 during moving image recording to a range (Pnear to Pfar), moving image recording is not performed in a range in which in-focus is not achieved, and thus a time taken for moving image recording can be shortened. In this regard, according to the moving image recording, moving images are recorded according to a predetermined format for moving image data. For example, the moving images are recorded according to MP4 standards (H.264/MPEG-4.AVC scheme). While the moving image recording is executed, display monitor 220 may display, for example, an icon or a message indicating that the moving image recording is performed.

Further, controller 180 associates the position of focus lens 111 and a frame number of each frame image which configures a moving image during the moving image recording. Thus, the frame number is associated with each AF region in in-focus information table 60B (see row b in FIG. 7B).

While the moving image recording is performed, display monitor 220 displays an image which is being recorded. However, display monitor 220 may highlight an in-focus region of the image to make the user recognize the in-focus region. By highlighting the focused region, the user can easily learn an in-focused region in the image.

Figure 8:
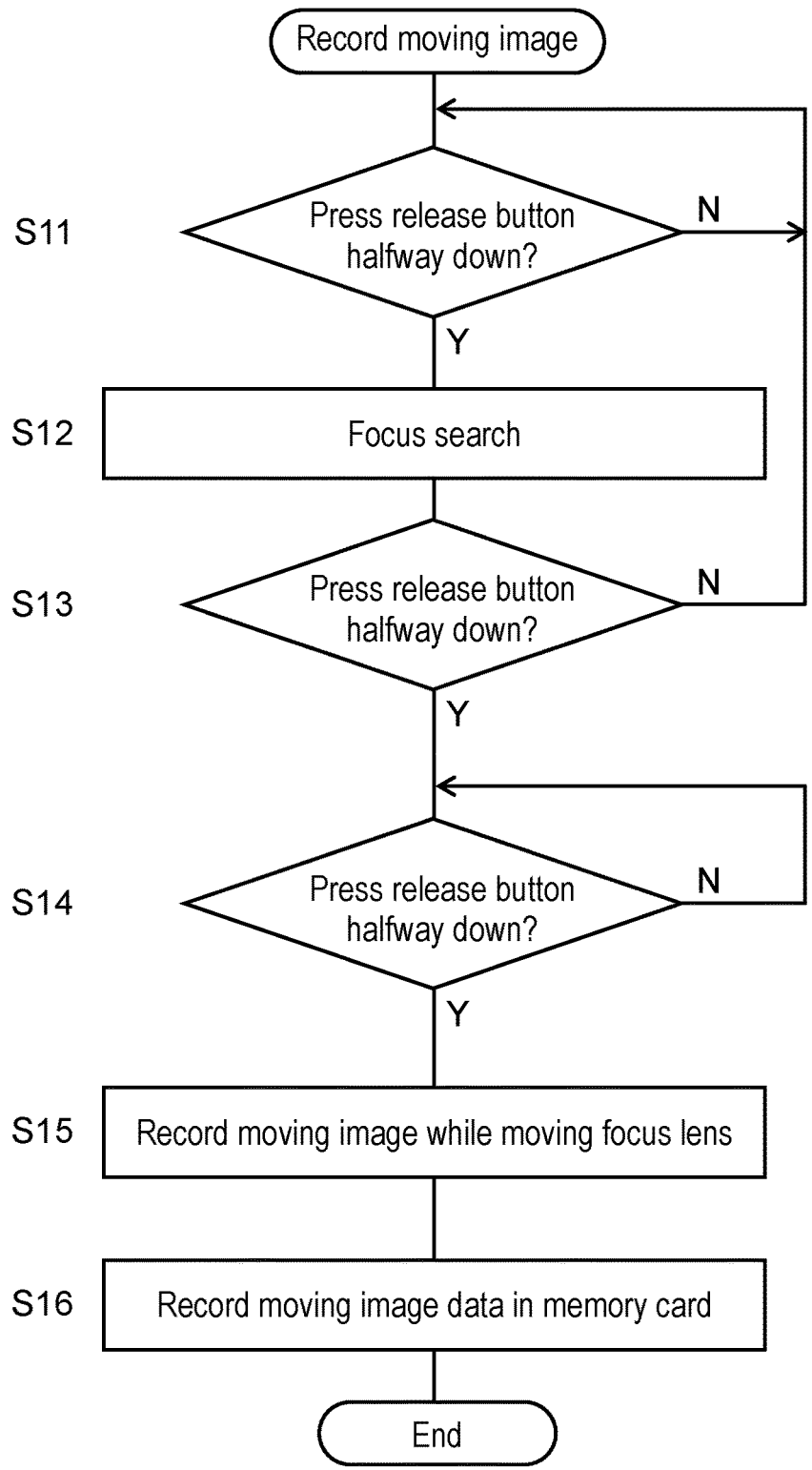
FIG. 8 is a flowchart illustrating a focus search operation and multifocus moving image recording processing.

Back to FIG. 8, when the moving image recording (S15) is finished, moving image data in which in-focus information table 60B is recorded in the header is recorded in memory card 200 (S16). Thus moving image (multifocus moving image) recording processing (S1) is finished.

After the moving image recording (S1) is finished, depth synthesis processing (S2) is executed according to a user's instruction.

2-1-2. Depth Synthesis Processing

Figure 10A:
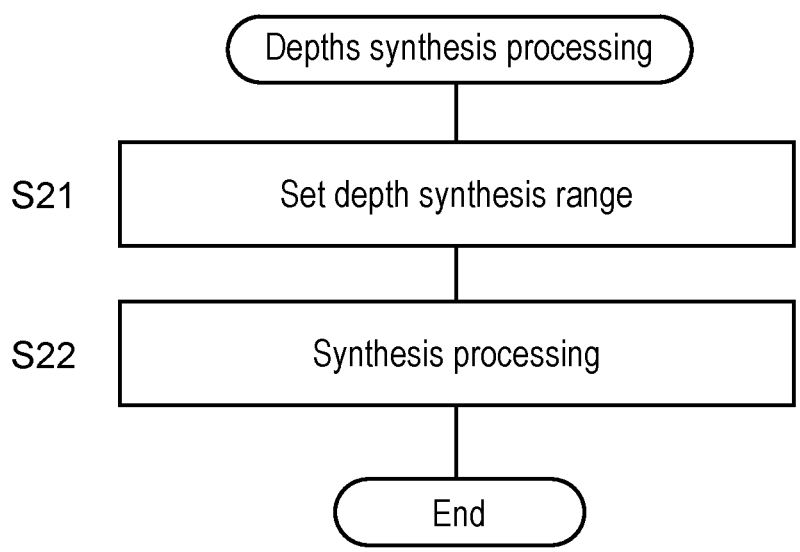
FIG. 10A is a flowchart illustrating depth synthesis processing.

The depth synthesis processing (S2) will be described below. FIG. 10A is a flowchart illustrating the depth synthesis processing. According to the depth synthesis processing, controller 180 first sets a object range which is desired to be focused, i.e., a range (referred to as a depth synthesis range) of a object whose depth is desired to be synthesized (S21). Subsequently, synthesis processing is performed based on the set depth synthesis range (S22). Each processing (S21 and S22) will be described below.

2-1-2-1. Setting of Depth Synthesis Range

First, a user's operation of designating the depth synthesis range will be described with reference to FIGS. 10B, 10C, 11 and 12.

Figure 10B:
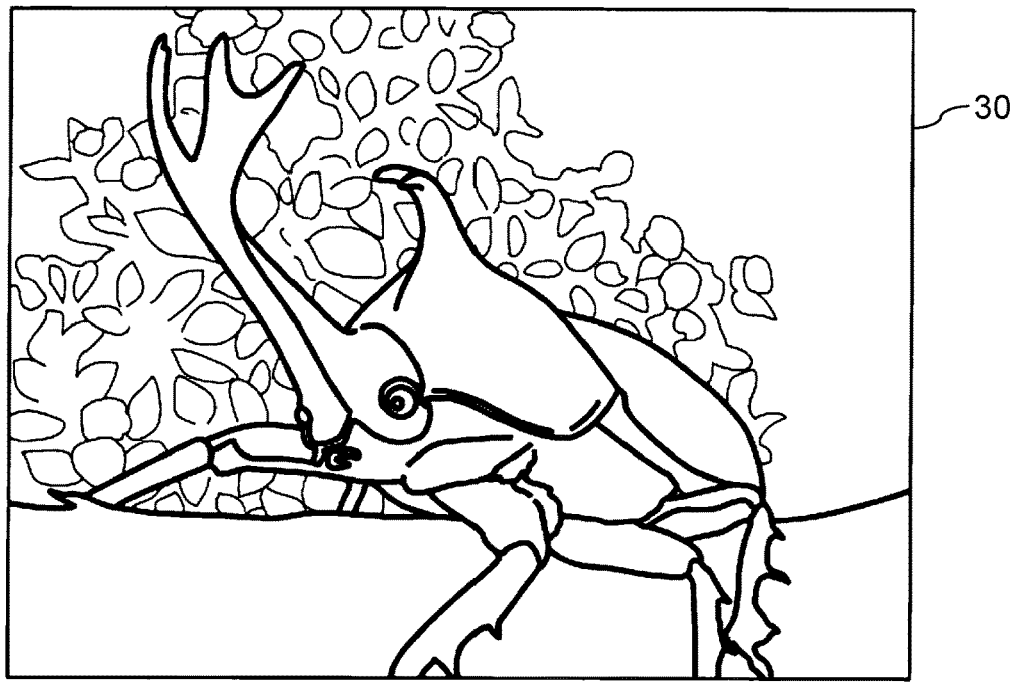
FIG. 10B is a view illustrating an example of a preview image.
Figure 10C:
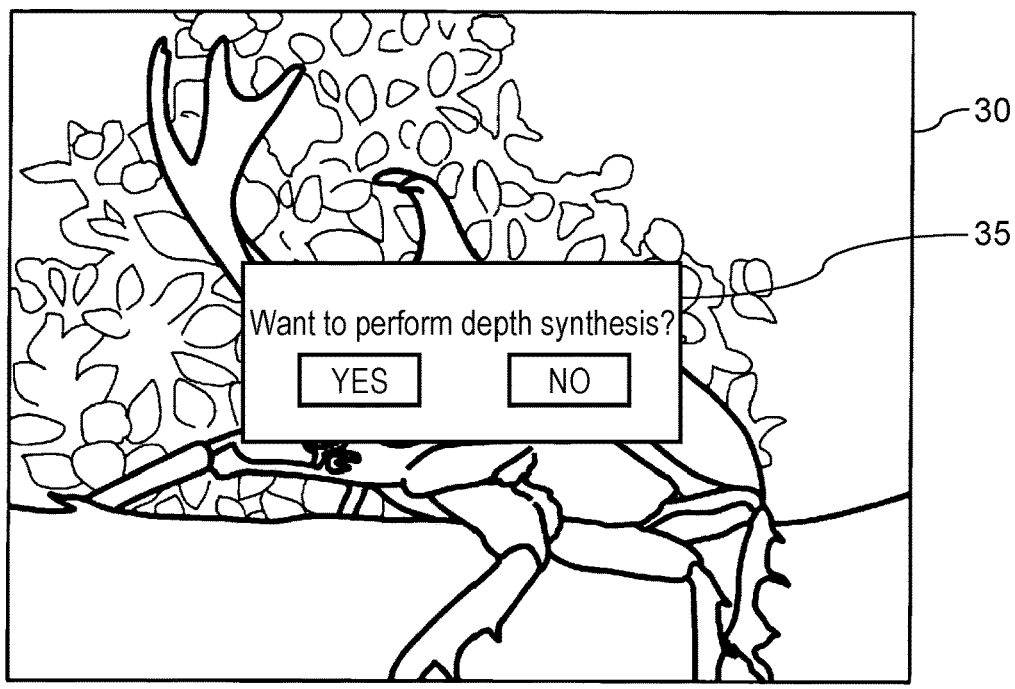
FIG. 10C is a view illustrating an example of a screen for confirming to a user whether to perform depth synthesis.

Immediately after recording multifocus moving image is finished, as illustrated in FIG. 10B, display monitor 220 displays preview image 30 (still image) for checking the recorded image. Preview image 30 is one image of a plurality of frame images which configures the recorded multifocus moving images. When the user performs a predetermined operation (e.g., an operation for touching a touch panel or an operation of a predetermined button) in a state where this preview image 30 is displayed, as illustrated in FIG. 10C, dialogue box 35 for confirming to the user whether to perform depth synthesis is displayed on preview image 30. In this regard, dialogue box 35 may be displayed when a still image (one frame image) which represents multifocus moving images is displayed on a playback screen for selecting and playing back recorded images, and when the user performs a predetermined operation.

When "YES" is selected on this dialogue box 35, controller 180 causes display monitor 220 to display a range designation screen for designating a object range (region) which the user desires to focus.

Figure 11:
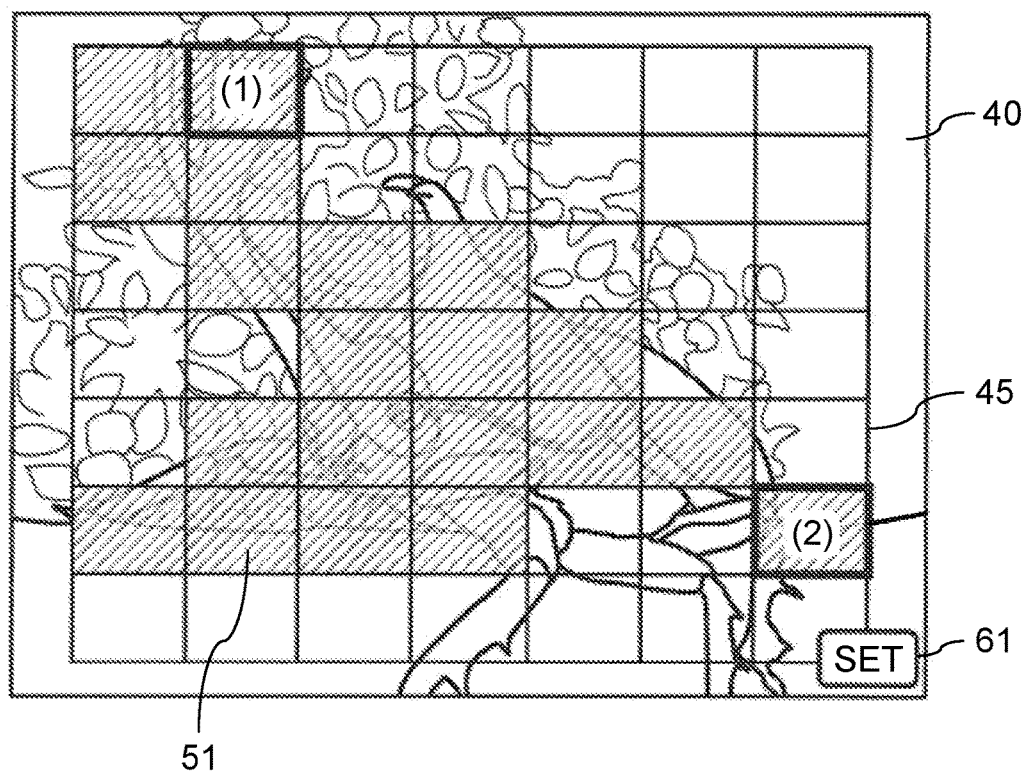
FIG. 11 is a view illustrating a display example of a range designation screen for designating a depth synthesis range.
Figure 12:
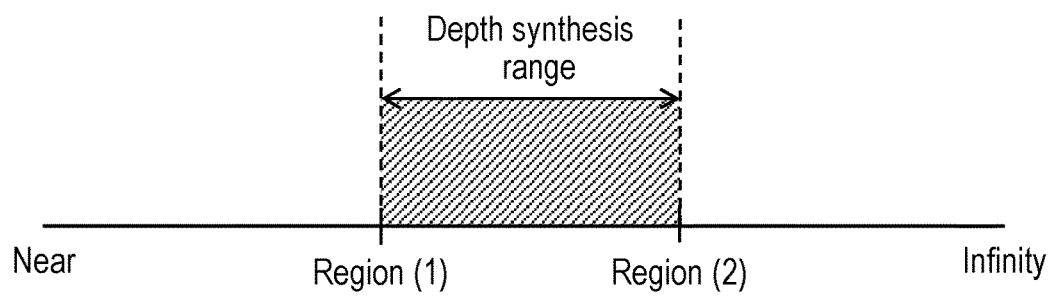
FIG. 12 is a view for explaining a change in a depth synthesis range set according to user's designation of a region.

FIG. 11 is a view illustrating an example of range designation screen 40. Range designation screen 40 shows preview image 30, i.e., one frame image (object image) of frame images which configure multifocus moving images, and region frame 45 indicating a plurality of image regions (referred to simply as "regions") which are superimposed on the one frame image. Region frame 45 defines 49 (7 rows×7 columns) regions. Each region indicated by region frame 45 corresponds to each AF region illustrated in part (a) in FIG. 6. The user can designate the depth synthesis range by designating two regions (a start point and an end point of the depth synthesis range) by a touch operation on range designation screen 40. In this regard, region frame 45 may not be displayed on display monitor 220.

When the user designates the two regions on range designation screen 40, highlight 51 of regions corresponding to the depth synthesis range appears. As illustrated in, for example, FIG. 12, designated region (1), designated region (2), and a region group corresponding to AF regions having an in-focus position between an in-focus position of an AF region corresponding to region (1) and an in-focus position of an AF region corresponding to region (2) on range designation screen 40 configure the depth synthesis range. Highlight 51 indicating this depth synthesis range appears on range designation screen 40 as illustrated in FIG. 11. This highlight 51 allows the user to easily recognize the range (depth synthesis range) which the user sets and desires to focus. By touching "SET" button 61 or pressing determination button 214 on a camera back surface, the user can determine the depth synthesis range designated on range designation screen 40.

2-1-2-2. Synthesis Processing

The synthesis processing (S22) in the flowchart in FIGS. 10A to 10C will be described. Controller 180 refers to in-focus information table 60B for the regions specified as the depth synthesis range, and specifies a frame number of each frame image having an in-focus position in each region. Further, controller 180 causes image processor 160 to execute the depth synthesis processing by using the frame images associated with the specified frame numbers. Image processor 160 executes the depth synthesis processing in response to an instruction from controller 180.

In this regard, when the focus lens position changes in optical system 110 of digital camera 100 according to the first exemplary embodiment, an angle of view changes, and the size of the object image formed on the imaging plane of CCD 140 changes. That is, the image magnification changes.

Figure 13:
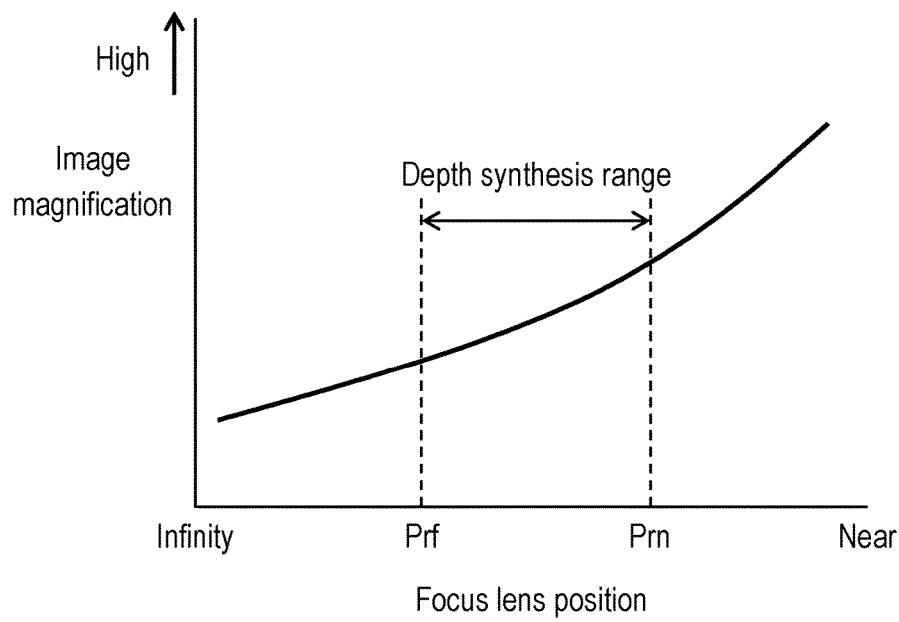
FIG. 13 is a view for explaining a change in an image magnification according to a focus lens position.

FIG. 13 is a view for explaining a change of an image magnification according to the focus lens position. FIG. 13 illustrates that, when the focus lens position is closer to the near end, the image magnification is higher.

Figure 14:
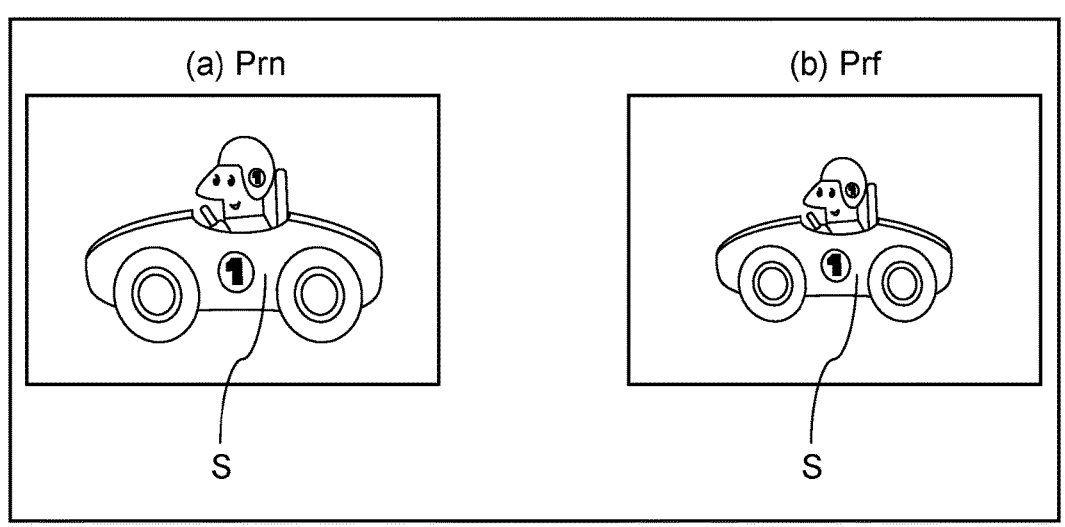
FIG. 14 is a view for explaining a change in a size of a object in a picked-up image caused by a change in the image magnification.

FIG. 14 is a view for explaining a change of a size of a object in a picked-up image caused by a change in the image magnification in the optical system which indicates the image magnification change as in FIG. 13. A object in a picked-up image will be referred to as a object image. Part (a) of FIG. 14 illustrates object image S formed on the imaging plane of CCD 140 when the focus lens position is at focus lens position Prn (see FIG. 13) which is the closest to the near end in the depth synthesis range. Part (b) of FIG. 14 illustrates object image S formed on the imaging plane of CCD 140 when the focus lens position is at focus lens position Prf (see FIG. 13) which is the closest to the infinity end in the depth synthesis range. In the example in FIG. 14, the angle of view becomes larger and the image magnification (the size) of object image S is smaller at focus lens position Prf on the infinity side than at focus lens position Prn on the near side.

When the depth synthesis is performed by using frame images of different image magnifications, an outline of the object included in a generated synthesis image becomes irregular, and good quality cannot be obtained. In the first exemplary embodiment, when depth synthesis is performed to generate still image data, the still image data is generated by taking into account the image magnification of each frame image to deal with this problem.

Figure 15A:
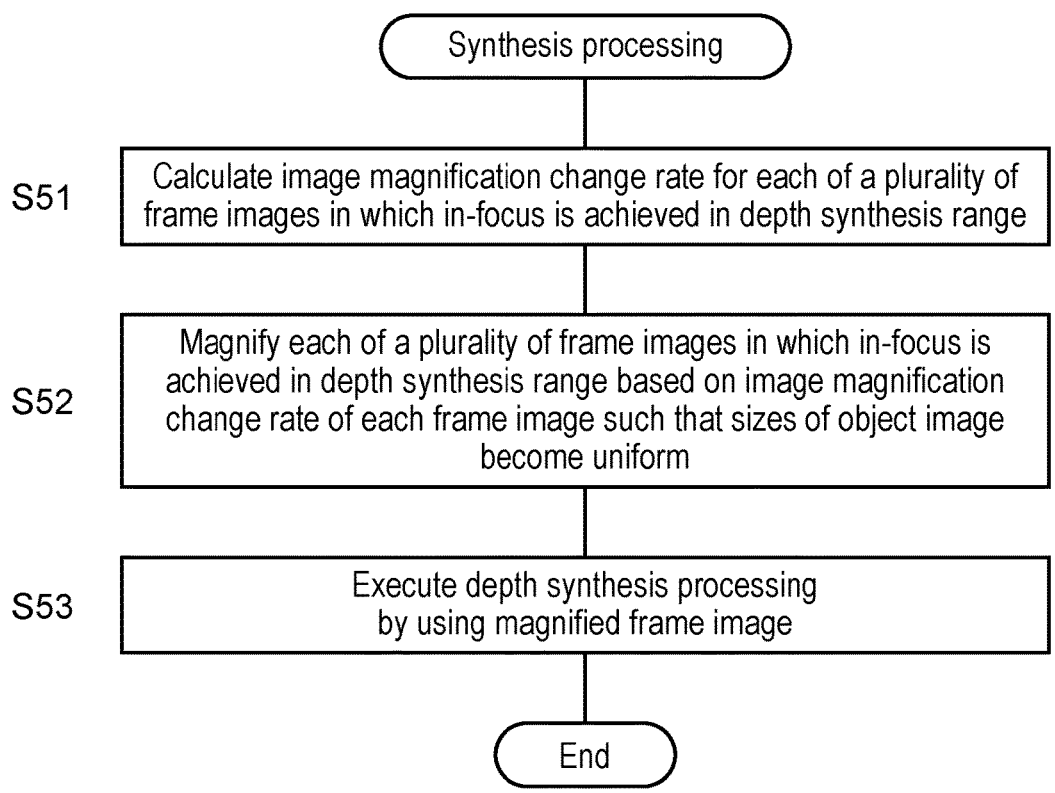
FIG. 15A is a flowchart illustrating an outline of synthesis processing which takes the change in the image magnification into account.

FIG. 15A is a flowchart illustrating an outline of the depth synthesis processing which takes the change in the image magnification into account.

Controller 180 calculates an image magnification change rate of each frame image included in the depth synthesis range (S51). Details of calculation of the image magnification change rate will be described below. Controller 180 causes image processor 160 to magnify each of a plurality of frame images included in the depth synthesis range based on the image magnification change rate of each frame image such that the size of the object image in all frame images becomes the same (S52), and perform the depth synthesis processing by using these magnified frame images (S53).

2-1-2-2-1. Calculation of Image Magnification Change Rate

Figure 16:
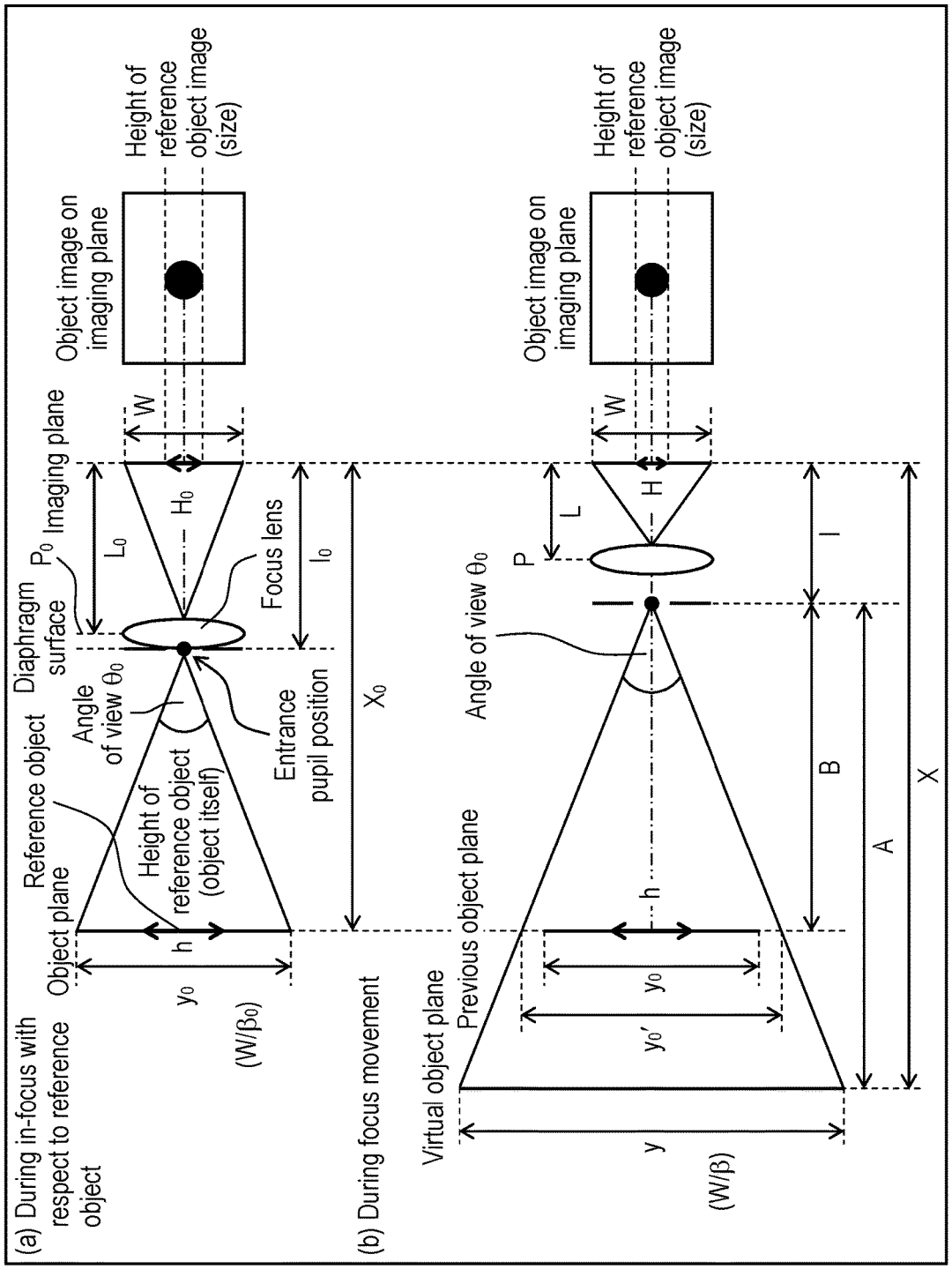
FIG. 16 is a view for explaining a calculation principal for an image magnification change rate.

Calculation of the image magnification change rate in step S51 will be described in detail with reference to FIG. 16. FIG. 16 is a view for explaining a calculation principal for the image magnification change rate.

Part (a) of FIG. 16 is a view for explaining at what size a focused object (referred to as a reference object) is imaged on the imaging plane. When h represents a height of this reference object, y0 represents a height of an object plane, L0 represents a distance from the imaging plane to the focus lens at focus lens position P0 (referred to as a "focus lens distance" below), and I0 represents a distance from the imaging plane to a diaphragm surface and an entrance pupil position, H0 represents a height of the reference object (referred to as a reference object image below) on the imaging plane. In this regard, height y0 of the object plane is a height corresponding to a height of the imaging plane (a distance between an upper and a lower end of the imaging plane) at an object side. Height y0 of the object plane can be calculated according to y0=W/β0 by dividing lateral width (height) W of CCD 140 by lateral magnification β0 corresponding to focus lens position P0. Further, an angle formed by a line that connects the entrance pupil position and the upper end of object plane y0, and a line that connects the entrance pupil position and the lower end of object plane y0 is an angle of view θ0. The entrance pupil position is a position of an entrance pupil which is optically determined, and, in examples of parts (a) and (b) of FIG. 16, the entrance pupil position is at a center position of the diaphragm. In this regard, parts (a) and (b) of FIG. 16 illustrate a simplified optical system in which the diaphragm is disposed at a front surface side of the lens (an object side) in an optical axis direction for simplification of description. However, the present disclosure is not limited to such disposition, and is applicable to any optical system having entrance pupils, too.

Part (b) of FIG. 16 is a view for explaining at what size reference object is projected on the imaging plane when the focus lens is moved from a state where the reference object illustrated in part (a) of FIG. 16 is focused. Part (b) of FIG. 16 illustrates the state where the reference object is not focused. The height h of the reference object is the same as the height in part (a) of FIG. 16. When the focus lens is moved from position P0 corresponding to distance L0 in part (a) of FIG. 16 to position P corresponding to distance L in part (b) of FIG. 16, the angle of view changes from θ0 to θ and the focused object plane moves. When the object plane after movement is a virtual object plane, a height of this virtual object plane is y. Height y of the virtual object plane is calculated by dividing width W of CCD 140 by lateral magnification β which changes according to a focus lens position. Further, for simplification of description, when the focus lens moves to a position at above distance L, the diaphragm surface and entrance pupil position also move, and a distance from the imaging plane to the diaphragm surface and the entrance pupil position changes to I. In this regard, distance I from the imaging plane to the focus lens, distance X from the imaging plane to the object surface, and lateral magnification β for calculating height y of the virtual object plane are associated in an image magnification change rate calculation information table in built-in memory 240 as illustrated in FIG. 17.

In part (a) of FIG. 16, the height of the object plane is y0. In part (b) of FIG. 16, height y0 of the object plane in part (a) of FIG. 16 changes to y0'. Even when the focus lens is moved from the position at distance L0 to a position at distance L, height h of the reference object on the object plane side does not change. Therefore, the reference object image on the imaging plane changes to a size (a height) calculated according to H=y0/y0'×H0. In this regard, in the example in part (b) of FIG. 16, the reference object image on the imaging plane becomes small.

In part (a) of FIG. 16 and part (b) of FIG. 16, values of shooting distances X0 and X are determined according to a focus lens position. In the first exemplary embodiment, shooting distances X0 and X can be calculated based on the focus lens position from the image magnification change rate calculation information table.

The distance A between the entrance pupil position and the virtual object plane after the movement of the focus lens can be calculated according to A=X−I. Distance B between the entrance pupil position and the object plane can be calculated according to B=X0−I. Further, height y0' of the object plane on a previous object plane can be calculated according to y0'=B/A×y. Height y of the virtual object plane in part (b) of FIG. 16 can be calculated according to y=W/β by dividing lateral width W of CCD 140 by lateral magnification β associated with the focus lens position in part (b) in FIG. 16.

In this regard, image magnification change rate Z is Z=H/H0. Therefore, when this equation is deformed based on above description contents, following equation 1 for calculating image magnification change rate Z can be obtained. Further, image magnification change rate Z of the reference object can be calculated by substituting a value obtained from the image magnification change rate calculation information table in this equation 1. In this regard, a symbol "*" means a multiplication symbol in the following equation.

$$\begin{aligned}
Z &= H/H0 \\
&= y0/y0' \\
&= y0/((B/A)*y) \\
&= (W/\beta o)/((B/A)*(W/\beta)) \\
&= (A/B)*(\beta/\beta 0) \\
&= ((X-I)/(X0-I)*(\beta/\beta 0) \\
Z &= ((X-I)/(X0-I)*(\beta/\beta 0) \quad \text{(Equation 1)}
\end{aligned}$$

FIG. 17 is a view illustrating an example of the image magnification change rate calculation information table. The image magnification change rate calculation information table is stored in advance in built-in memory 240. In the image magnification change rate calculation information table, distance I between the imaging plane and the entrance pupil position and distance X between the imaging plane and the object plane (an object plane to be focused) are recorded in association with a plurality of positions (focus lens position P) to which the focus lens can be set by a focus motor. When, for example, focus lens position P is P1, distance I between the imaging plane and the entrance pupil position and distance X between the imaging plane and the object plane are recorded as I1 and X1. When focus lens position P is P2, distance I between the imaging plane and the entrance pupil position and distance X between the imaging plane and the object plane are recorded as I2 and X2. When the in-focus is achieved at given focus lens position P, it is possible to recognize that there exists a object (referred to as an in-focus object) focused at a position at distance X between the imaging plane and the object plane obtained based on this focus lens position P. In other words, a distance from the imaging plane to the in-focus object can be recognized. The entrance pupil position is determined according to configurations of the lens and diaphragm 300 included in optical system 110, and the focus lens position. Hence, distance I between the imaging plane and the entrance pupil position is also determined according to the configurations of the lens and diaphragm 300 included in optical system 110, and the focus lens position. A value calculated in advance according to the focus lens position is stored in the image magnification change rate calculation information table. Further, distance X between the imaging plane and the object plane and lateral magnification β are also determined according to the configuration of the lens included in optical system 110, and the focus lens position. A value calculated in advance according to the focus lens position is stored in the image magnification change rate calculation information table.

Figure 15B:
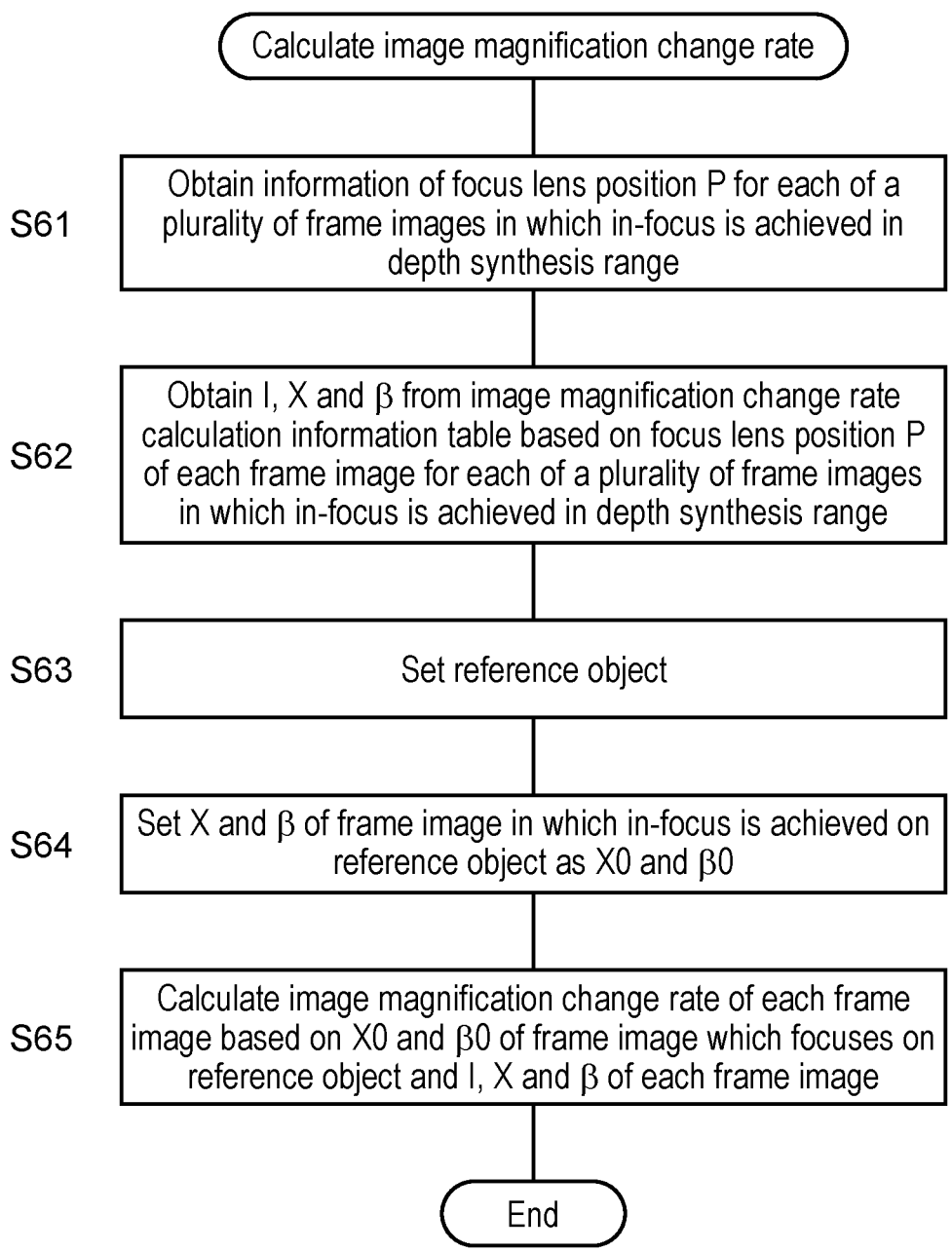
FIG. 15B is a flowchart illustrating image magnification change rate calculation processing.

FIG. 15B is a flowchart illustrating the above image magnification change rate calculation processing. Controller 180 obtains information about focus lens position P of each of a plurality of frame images included in the depth synthesis range (S61). Information about focus lens position P in each frame image is stored in a header of each frame image. In this step, controller 180 reads information about focus lens position P from the header of each frame image.

Controller 180 obtains entrance pupil position I, distance X to the object plane and lateral magnification β from the image magnification change rate calculation information table based on the information about focus lens position P of each frame image obtained in step S61 for each of a plurality of frame images included in the depth synthesis range (S62).

Controller 180 sets the reference object (S63). Controller 180 sets as the reference object, for example, a main object which is in the frame images included in the depth synthesis range set by the user and is focused in one frame image in the depth synthesis range (S63). A known object recognition technique such as face recognition may be used to recognize the reference object. Whether the reference object is focused can be decided by referring to the in-focus information table.

Controller 180 sets distance X to the object plane and lateral magnification β in the frame image in which the reference object is focused in the depth synthesis range as X0 and β0 (S64).

Controller 180 calculates the image magnification change rate of each frame image based on X0 and β0 of the frame image in which the reference object is focused, and I, X and β of each frame image in the depth synthesis range (S65).

2-1-2-2-2. Frame Image Magnification Processing

Figure 18A:
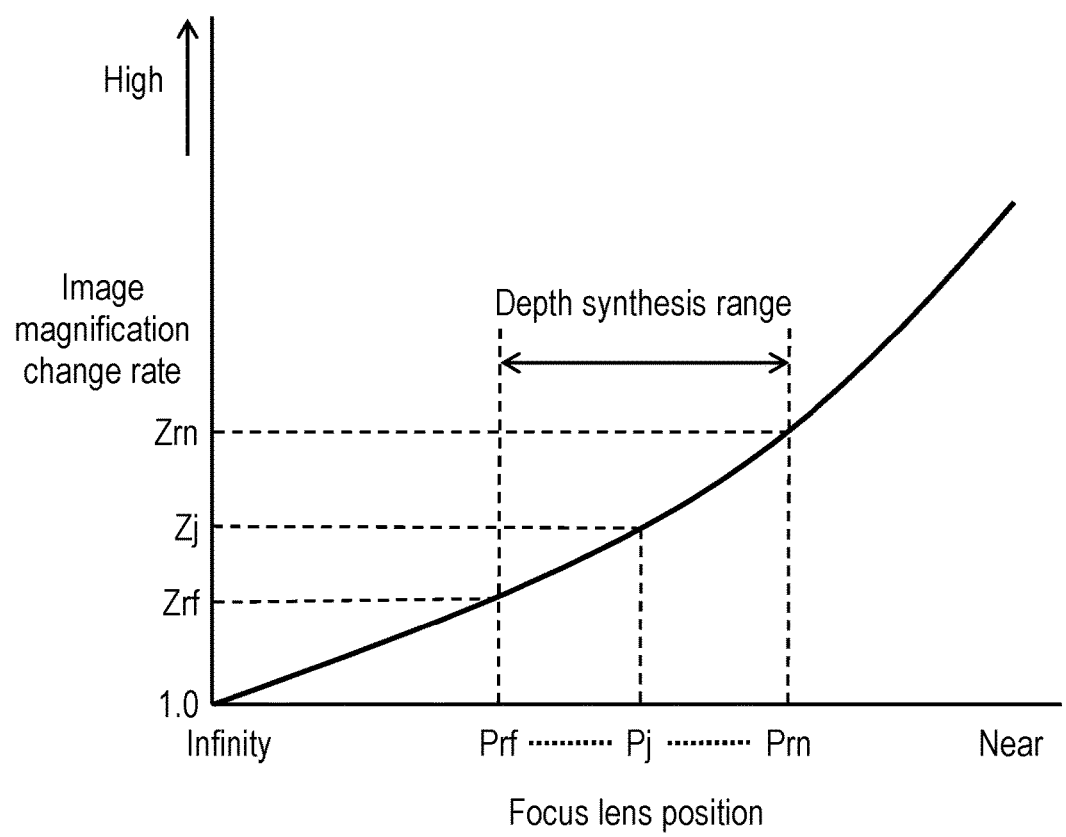
FIG. 18A is a view for explaining a concept of synthesis processing which takes the image magnification change into account.

A method of the frame image magnification processing in step S52 in FIG. 15A will be described with reference to FIGS. 18A, 18B and 18C. FIG. 18A is a view for explaining a concept of the synthesis processing which takes the image magnification change into account. FIG. 18A illustrates that, when the focus lens position is closer to the near end, the image magnification change rate is higher. Further, an inclination of a curve of the image magnification change rate of the object image differs according to the distance from the imaging plane of CCD 140 to the object (object plane). Therefore, when the number of reference objects is plural, a plurality of image magnification change rates is calculated. However, in the first exemplary embodiment, an attention is paid to one in-focus object (one reference object) at a position at a given distance in the optical axis direction from the imaging plane of CCD 140. The image magnification change rate of each frame image in which in-focus is achieved in the depth synthesis range is calculated. In this regard, a higher image magnification change rate of the in-focus object (the reference object) means a higher image magnification of the in-focus object (the reference object).

Further, based on a frame image of the largest image magnification change rate (the image magnification) among a plurality of frame images in which the in-focus is achieved in the depth synthesis range, each of the rest of frame images is enlarged according to each image magnification change rate. In case of FIG. 18A, the frame image of the largest image magnification change rate among a plurality of frame images in which the in-focus is achieved in the depth synthesis range is a frame image corresponding to focus lens position Prn which is the closest to the near side in the depth synthesis range, and the image magnification change rate of this frame image is Zrn. Hence, as illustrated in FIG. 18B, based on frame image Frn corresponding to this focus lens position Prn, each of the rest of frame images Frj is enlarged based on magnification Ej corresponding to the image magnification change rate Zj at focus lens position Pj at which each frame image is picked up.

Magnification Ej of each frame image included in the depth synthesis range can be calculated according to equation 2.

$$Ej = Zrn/Zj \qquad \text{(Equation 2)}$$

Consequently, the height (the size) of the object image in a plurality of frame images in which in-focus is achieved in the depth synthesis range can be made to be uniform.

According to the above magnification processing, a frame image of a smaller image magnification than a reference frame image, in other words, a frame image of a larger angle of view than the reference frame is enlarged. Therefore, each frame image other than the reference frame image includes an entire object in the reference frame image. Consequently, when the depth synthesis processing is performed, image contents hardly become insufficient, and a synthesis image of good quality can be generated.

In this regard, based on a frame image of the smallest image magnification change rate among a plurality of frame images in which in-focus is achieved in the depth synthesis range, each of the rest of frame images may be reduced according to each image magnification change rate. In case of FIG. 18A, the frame image of the smallest image magnification change rate among a plurality of frame images in which in-focus is achieved in the depth synthesis range is a frame image corresponding to focus lens position Prf which is the closest to the infinity side among frame images in which in-focus is achieved in the depth synthesis range, and the image magnification change rate of this frame image is Zrf. Hence, as illustrated in FIG. 18C, based on frame image Frf corresponding to this focus lens position Prf, each of the rest of frame images Frj is reduced based on a magnification corresponding to the image magnification change rate Zj of each frame image at which each frame image is picked up.

Magnification Ej of each frame image included in the depth synthesis range in this case can be calculated according to equation 3.

$$Ej = Zrf/Zj \qquad \text{(Equation 3)}$$

According to this magnification processing, the frame images are reduced and synthesized, so that image resolution hardly degraded. Consequently, a depth synthesis image of good quality can be generated.

2-1-2-2-3. Synthesis Processing

In step S53 in FIG. 15A, controller 180 generates a synthesis image of a deeper depth by using a plurality of magnified frame images having the substantially same size (height) on a picked-up image by performing magnification processing. Consequently, it is possible to prevent the outline of the object included in the generated synthesis image from being irregular, and provide good synthesis image quality.

3. Effects

Digital camera 100 (an example of imaging device) according to the first exemplary embodiment includes CCD 140 (an example of an imaging sensor) that picks up a object image and generates image data, and optical system 110 that forms the object image on the imaging plane of CCD 140, and changes the image magnification of the object image formed on the imaging plane when the focus lens position is changed along the optical axis. Further, digital camera 100 includes image processor 160 and controller 180 (an example of a controller) that set a focus lens position of optical system 110 to a plurality of different positions, and cause CCD 140 to generate a plurality of pieces of image data by imaging the object image at the respective positions, and generate still image data of a deeper depth of field based on the plurality of pieces of generated image data. When generating the still image data, controller 180 causes image processor 160 to obtain the entrance pupil position of optical system 110 based on the focus lens position during imaging for each of a plurality of pieces of image data, calculate the image magnification change rate of the object image based on each obtained entrance pupil position, magnify the size of each picked-up image based on the calculated image magnification change rate such that the size of the object image on the picked-up image indicated by each image data becomes the same between a plurality of pieces of image data, and generate the still image data of a deeper depth of field based on the plurality of pieces of magnified image data. It is to be noted that the phrase "pick up the object image while moving the focus lens" according to the present disclosure includes not only picking up during movement of the focus lens but also repeating picking up while the lens is stationary after the movement.

Digital camera 100 of the present disclosure magnifies the size of the picked-up image indicated by each image data such that the size of the object image on the picked-up image indicated by each image data becomes identical to each other between the plurality of pieces of image data, and generates the still image data of a deeper depth of field based on the plurality of magnified image data. Even when the image magnification of the object image formed on the imaging plane when the focus lens position of optical system 110 is changed changes, a synthesis image of high quality and a deeper depth of field can be generated.

Further, when magnifying a plurality of pieces of image data, controller 180 magnifies the rest of pieces of image data in the enlargement direction based on image data of the largest image magnification change rate. Consequently, image contents included in the reference image data includes a magnification target image in the enlargement direction. Consequently, necessary image contents hardly become insufficient when the depth synthesis processing is performed, and a synthesis image of good quality can be generated.

Further, when magnifying a plurality of pieces of image data, controller 180 may magnify the rest of pieces of image data in the reduction direction based on image data of the smallest image magnification change rate. Consequently, resolution of the depth synthesis image is hardly degraded. Consequently, a depth synthesis image of good quality can be generated.

Modified Example of First Exemplary Embodiment

In above example, lateral magnification β is defined in an image magnification change rate calculation information table in FIG. 17, and image magnification change Z (=H/H0) is calculated by using lateral magnification β. However, by defining angle of view θ instead of lateral magnification β in the image magnification change rate calculation information table in FIG. 17, image magnification change Z (=H/H0) may be calculated by using angle of view θ. In this case, in steps S62, S64 and S65 in a flowchart in FIG. 15B, angle of views θ and θ0 defined in the image magnification change rate calculation information table in FIG. 17 are used instead of lateral magnifications β and β0.

In the present modified example, height y0 of an object plane in FIG. 16 is calculated as $y0/2 = (x0-I0)*\tan(\theta 0/2)$, by using angle of view θ0.

Further, height y0' of the object plane can be calculated as $y0'/w = ((X0-I)/(X-I))*y/2$, by using angle of view θ0.

In this regard, $y/2 = (x-I)*\tan(\theta/2)$ holds, and therefore $y0'/2 = (x0-I)*\tan(\theta/2)$ holds.

Consequently, image magnification change rate Z can be calculated as follows by using the angle of view.

$$Z = H/H0$$
$$= y0/y0'$$
$$= ((X0-I0)*\tan(\theta 0/2))/((X0-I)*\tan(\theta/2))$$

$$Z = ((X0-I0)*\tan(\theta 0/2))/((X0-I)*\tan(\theta/2)) \quad \text{(Equation 1a)}$$

As described above, digital camera 100 (an example of an imaging device) according to present modified example includes CCD 140 (an example of an imaging sensor) that picks up the object image and generates image data, and optical system 110 that forms the object image on the imaging plane of CCD 140, and changes the image magnification of the object image formed on the imaging plane when the focus lens position is changed along the optical axis. Further, digital camera 100 includes image processor 160 and controller 180 (an example of a controller) that set a focus lens position of optical system 110 to a plurality of different positions, and cause CCD 140 to generate a plurality of pieces of image data by imaging the object image at the respective positions, and generate still image data of a deeper depth of field based on the plurality of pieces of generated image data. When generating the still image data, controller 180 causes image processor 160 to calculate an angle of view of optical system 110 based on the focus lens position during imaging for each of the plurality of pieces of image data, calculate the image magnification change rate of the object image based on the calculated angle of view, magnify the size of each imaged image based on the calculated image magnification change rate such that the size of the object image on the imaged image indicated by each image data is the same between a plurality of pieces of image data, and generate the still image data of a deeper depth of field based on a plurality of pieces of magnified image data.

Similarly, in the present modified example, too, even when an image magnification of a object image formed on the imaging plane when a focus lens position of optical system 110 is changed changes, a synthesis image of high quality and a deeper depth of field can be generated.

Second Exemplary Embodiment

Figure 19A:
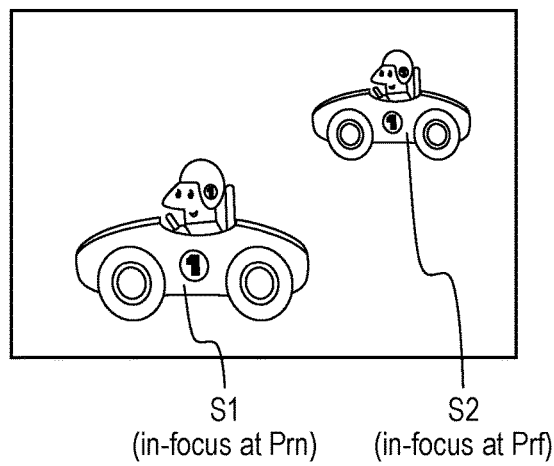
FIG. 19A is a view illustrating an example where two main objects are present in a frame image.

Depth synthesis processing of a digital camera (an example of an imaging device) according to a second exemplary embodiment will be described with reference to FIGS. 19A and 19B.

According to frame image magnification processing in the first exemplary embodiment, magnification processing is performed by calculating an image magnification change rate of one representative in-focus object at a position at a given distance from an imaging plane of CCD 140 in an optical axis direction. However, two in-focus objects S1, S2 which are able to become reference objects are present in a frame image as illustrated in FIG. 19A, and in-focus positions (focus lens positions) of these in-focus objects S1, S2 differ in some cases. The second exemplary embodiment provides an image data magnifying method with which a synthesis image of good quality can be generated in such a case.

Figure 19B:
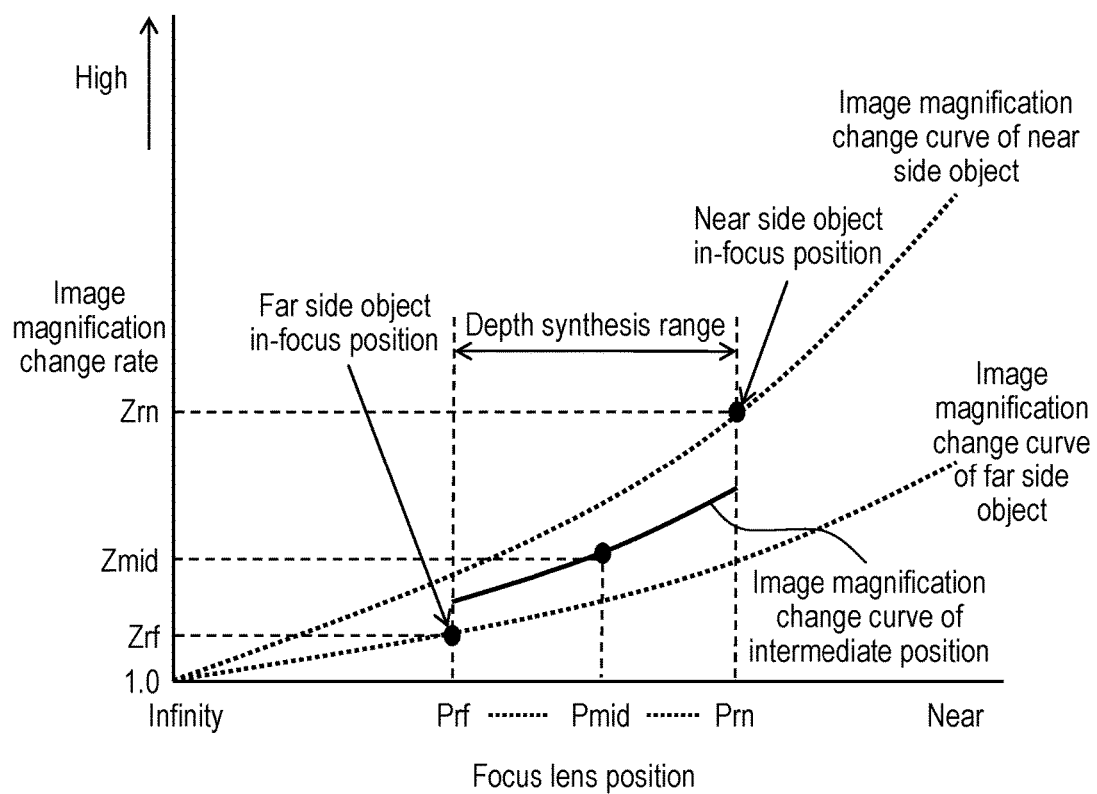
FIG. 19B is a view for explaining a concept of synthesis processing when in-focus objects are present at two different focus positions in the depth synthesis range during depth synthesis processing of digital camera 100 according to a second exemplary embodiment.

FIG. 19B is a view for explaining a concept of synthesis processing when in-focus objects S1, S2 are present at two different in-focus positions in a depth synthesis range during depth synthesis processing of digital camera 100 according to the second exemplary embodiment. In the second exemplary embodiment, two in-focus objects S1, S2 of the different in-focus distances are present in the depth synthesis range. Therefore, two image magnification change curves are present correspondingly to in-focus objects S1, S2. In FIG. 19B, in-focus object S1 at a near side (close to a user) is focused at focus lens position Prn which is the closest to a near end among focus lens positions at which in-focus is achieved in the depth synthesis range. In-focus object S2 at a far side (far from a user) is focused at focus lens position Prf which is the closest to an infinity end among focus lens positions at which in-focus is achieved in the depth synthesis range. Frame images in which in-focus is achieved in the depth synthesis range are a plurality of frame images picked up at different focus lens positions. In this case, according to the depth synthesis processing, a virtual image magnification change curve is calculated such that the in-focus distances in the depth synthesis range is based on intermediate focus lens position Pmid between focus lens position Prn which is the closest to the near end and focus lens position Prf which is the closest to the infinity end. That is, shooting distance Xmid and lateral magnification βmid corresponding to focus lens position Pmid are used as shooting distance X0 and lateral magnification β0 according to equation 1 which expresses the image magnification change curve. This means that a object which is focused at focus lens position Pmid is assumed to be present at focus lens position Pmid as a reference object described with reference to FIG. 16 and step S63, and the virtual object is set as the reference object. Further, the image magnification change rate of each frame image in which in-focus is achieved in the depth synthesis range is calculated based on this virtual image magnification change curve. When, for example, nine frame images picked up at different focus lens positions are present in frame images in which in-focus is achieved in the depth synthesis range, intermediate focus lens position Pmid is a focus lens position of the fifth frame image. Further, by using a method described in the first exemplary embodiment, each of the rest of frame images in the depth synthesis range is magnified in an enlargement direction according to image magnification change rate Zi of each frame image based on the frame image whose focus distance in the depth synthesis range corresponds to focus lens position Prn which is the closes to the near end. In this regard, each of the rest of frame images in which the focus is achieved in the depth synthesis range may be magnified in a reduction direction according to image magnification change rate Zi of each frame image based on the frame image whose focus distance in the depth synthesis range corresponds to focus lens position Prf which is the closes to the infinity end.

When first in-focus object S1 which is focused at first focus lens position Prn and second in-focus object S2 which is focused at second focus lens position Prf are present as objects, controller 180 (a controller) of digital camera 100 (an example of an imaging device) according to the second exemplary embodiment calculates an image magnification change rate based on intermediate focus lens position Pmid between first focus lens position Prn and second focus lens position Prf. Consequently, when two in-focus objects S1, S2 which are focused at different focus lens positions are present, an error can be suppressed as much as possible during synthesis caused by a difference between image magnifications of both in-focus objects S1, S2. Consequently, a synthesis image of good quality can be generated.

In this regard, in actual shooting environment, only one representative in-focus object is present in the depth synthesis range or two in-focus objects are present as described above in some cases. When one typical in-focus object is present in the depth synthesis range, magnification processing may be performed on one in-focus object by calculating the image magnification change rate by the method identical to the method in the first exemplary embodiment. Further, when the two objects are present, the magnification processing may be performed by calculating the image magnification change rate by the method described in the second exemplary embodiment. In this case, the number of in-focus objects at positions at different distances in the depth synthesis range can be calculated by using an image recognition technique such as face recognition or object recognition.

Third Exemplary Embodiment

1. Configuration of Digital Camera

Figure 20:
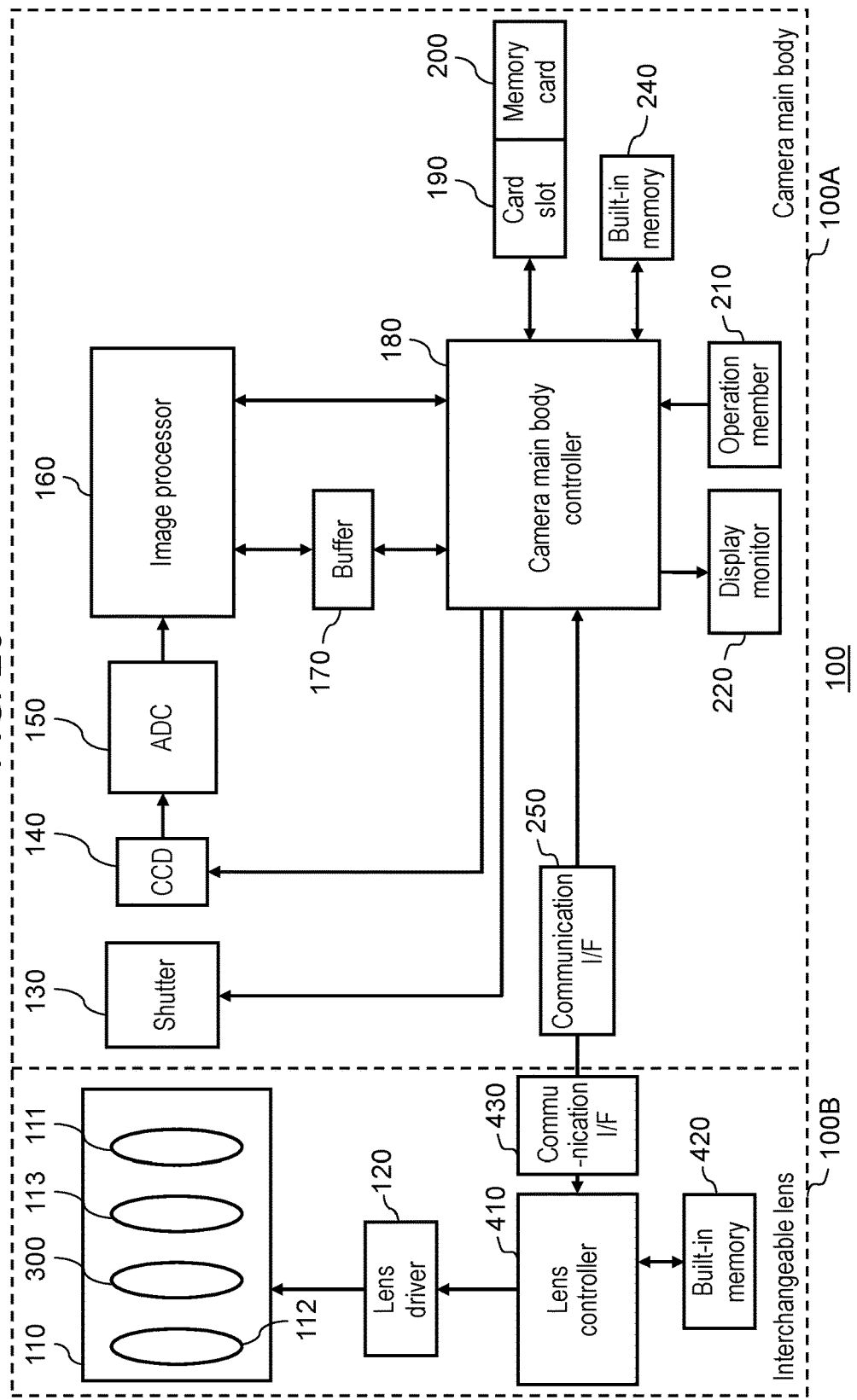
FIG. 20 is a view illustrating a configuration of a digital camera according to a third exemplary embodiment.

An electrical configuration of a digital camera (an example of an imaging device) according to a third exemplary embodiment will be described with reference to FIG. 20. FIG. 20 is a block diagram illustrating the configuration of digital camera 100. Digital camera 100 according to the third exemplary embodiment is a single-flex type digital camera whose lens can be exchanged, and includes camera main body 100A and interchangable lens 100B.

Camera main body 100A includes shutter 130, CCD 140, A/D converter 150, image processor 160, buffer 170, card slot 190, memory card 200, operation member 210, display monitor 220 and built-in memory 240 similarly to digital camera 100 in the first exemplary embodiment. Further, camera main body 100A includes camera main body controller 180A, and communication interface 250. Camera main body controller 180A controls an operation of camera main body 100A, and communicates with lens controller 410 of interchangable lens 100B via communication interfaces 250, 430 to control an operation of interchangable lens 100B.

Interchangable lens 100B includes optical system 110, lens driver 120 and diaphragm 300 similarly to digital camera 100 in the first exemplary embodiment. Further, interchangable lens 100B includes lens controller 410, built-in memory 420 and communication interface 430. Lens controller 410 communicates with camera main body controller 180A via communication interfaces 250, 430 to control lens driver 120.

Camera main body controller 180A determines whether to perform magnification processing on frame images in which in-focus is achieved in a depth synthesis range during depth synthesis processing based on information indicating a magnitude of an image magnification change of interchangable lens 100B attached to camera main body 100A. The information indicating the magnitude of the image magnification change of interchangable lens 100B is information indicating whether the image magnification change rate is predetermined value Zp or more when a focus lens is moved from a movable focus lens position (a near end) which is the closest to a near end to a movable focus lens position (an infinity end) which is the closest to an infinity side. The image magnification change rate (an image magnification) changes according to a distance to a position of a object. Therefore, predetermined value Zp is set based on the object position at which the image magnification change rate maximizes.

FIG. 21 is a view for explaining that an image magnification change rate differs according to an interchangable lens type. The change of the image magnification (the image magnification change rate) is particularly great in a macro-lens which can form a object image of the same size on the imaging plane of CCD 140. Further, in case of a telephoto lens, too, the change of the image magnification becomes great in some cases. Hence, a lens whose maximum value of the image magnification change rate is predetermined value Zp or more is a lens for which magnification processing needs to be performed during the depth synthesis processing. Predetermined value Zp is, for example, 1.2. When the maximum value of the image magnification change rate is 1.2 or less, even if the depth synthesis processing is performed without performing the magnification processing, a synthesis image hardly collapses, and a good-looking image can be obtained.

Built-in memory 240 of camera main body 100A stores a magnification processing target lens table in which part numbers of interchangable lenses 100B which needs to perform the magnification processing during the depth synthesis processing are recorded. A part number of interchangable lens 100B registered in magnification processing target lens table is an example of information indicating a magnitude of the image magnification change of interchangable lens 100B. FIG. 22 is a view illustrating an example of a magnification processing target lens table. In an example in FIG. 22, the part numbers of the magnification processing target lenses are recorded as H-H001A, H-H002A and H-H003A. Further, built-in memory 240 of camera main body 100A stores image magnification change rate calculation information tables for these magnification processing target lenses as illustrated in FIG. 24. These image magnification change rate calculation information tables contain information of each interchangable lens similar to information of the image magnification change rate calculation information table in FIG. 17 in the first exemplary embodiment.

Further, built-in memory 420 of interchangable lens 100B stores data indicating a part number of interchangable lens 100B. When interchangable lens 100B is attached, camera main body controller 180A obtains the part number of attached interchangable lens 100B via lens controller 410. Camera main body controller 180A performs magnification processing on frame images when the part number of attached interchangable lens 100 is registered in the magnification processing target lens table during the depth synthesis processing.

Figure 23:
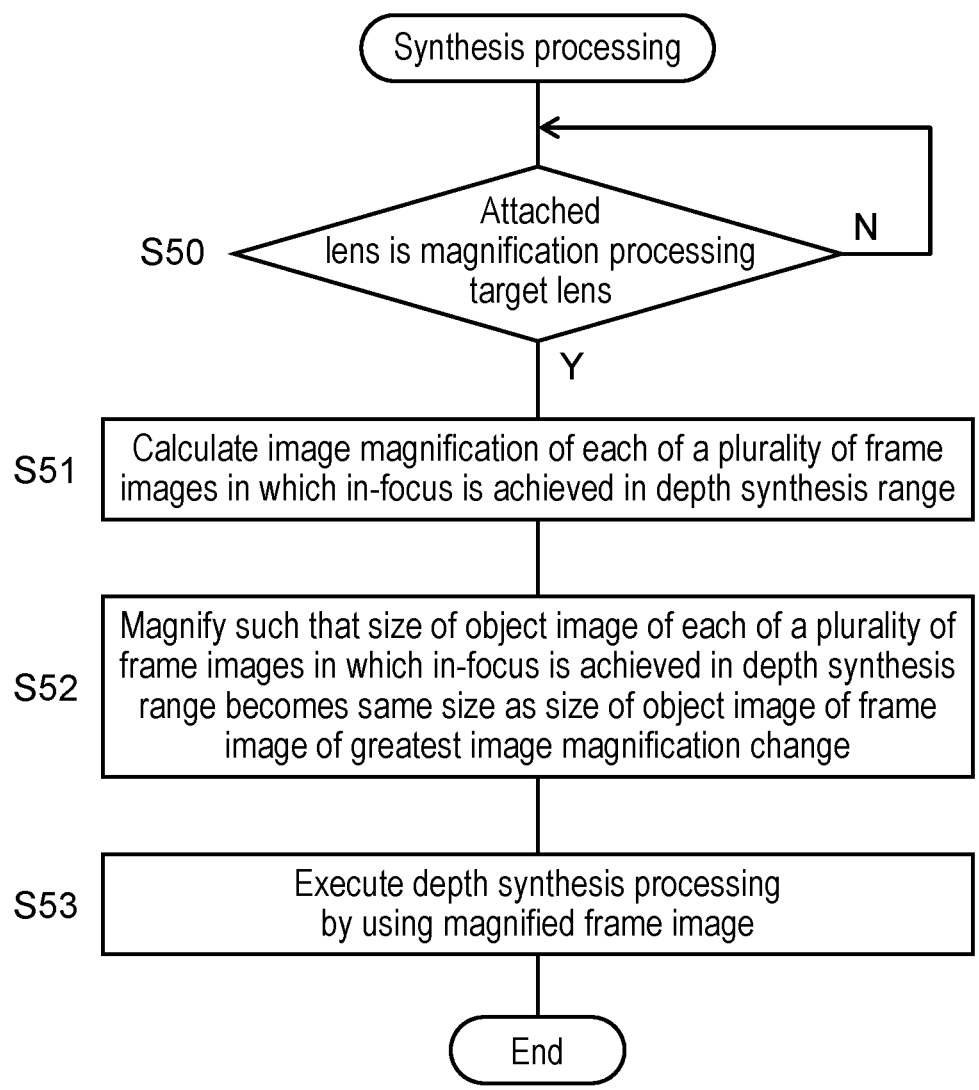
FIG. 23 is a flowchart illustrating synthesis processing according to a third exemplary embodiment.

FIG. 23 is a flowchart illustrating synthesis processing according to the third exemplary embodiment. In the third exemplary embodiment, whether attached interchangable lens 100B is a magnification processing target lens is decided by referring to the magnification processing target lens table at start of the synthesis processing (S50). Further, when attached interchangable lens 100B is the magnification processing target lens (YES in S50), the image magnification change rate calculation information table corresponding to the part number of the attached lens is read, and processing in same steps S51 to S53 as the steps in the first exemplary embodiment is performed (see FIG. 15A).

As described above, digital camera 100 (an example of an imaging device) according to the third exemplary embodiment includes camera main body 100A and interchangable lens 100B which is optical system 110 and is detachable from camera main body 100A. Camera main body 100A includes controller 180 (a controller), and built-in memory 240 (a storage). Built-in memory 240 stores information of each interchangable lens 100B indicating the magnitude of the image magnification change rate indicating whether the image magnification change rate in case where the focus lens position is changed in a predetermined range is predetermined value Zp or more. Controller 180 obtains the information indicating the magnitude of the image magnification change of interchangable lens 100B attached to camera main body 100A, and performs processing of magnifying a plurality of pieces of image data when the image magnification change rate is predetermined value Zp or more. Consequently, by performing synthesis processing only on an interchangable lens of a great image magnification change while taking into account the change of the image magnification, it is possible to reduce loads of the magnification processing with respect to image data and the depth synthesis processing in digital camera 100.

In the third exemplary embodiment, too, by defining angle of view θ instead of lateral magnification β in the image magnification change rate calculation information table similarly to the modified example of the first exemplary embodiment, image magnification change Z (=H/H0) may be naturally calculated by using angle of view θ.

Fourth Exemplary Embodiment

An actual optical system used in an imaging device has an aberration such as distortion aberration. Particularly, the distortion aberration increases or decreases an image magnification (an image height) of a object image formed on an imaging plane of CCD 140. Hence, during magnification processing according to the first exemplary embodiment to the third exemplary embodiment, a synthesis target frame image may be magnified by taking into account a change of an image magnification due to an aberration such as distortion aberration.

Other Exemplary Embodiments

As described above, the first exemplary embodiment to fourth exemplary embodiment have been described to exemplify a technique disclosed in the present application. However, the technique in the present disclosure is not limited to this, and can also be applied to an exemplary embodiment in which modification, replacement, addition, omission, or the like is performed appropriately. In addition, a new exemplary embodiment can be made by combining constituents described in the above first exemplary embodiment to fourth exemplary embodiment. Therefore, other exemplary embodiments will be described hereinafter.

(1) In the third exemplary embodiment, an image magnification change rate calculation information table is stored in built-in memory 240 of camera main body 100A yet may be stored in built-in memory 420 of interchangable lens 100B. In this case, when interchangable lens 100B is attached to camera main body 100A or depth synthesis processing is performed, camera main body controller 180A of camera main body 100A may obtain contents of the image magnification change rate calculation information table from built-in memory 420 of attached interchangable lens 100B.

(2) In the third exemplary embodiment, information indicating a magnitude of an image magnification change of interchangable lens 100B is recorded in the magnification processing target lens table as a part number of interchangable lens 100B which needs to perform magnification processing during the depth synthesis processing. Camera main body controller 180A decides whether interchangable lens 100B is an interchangable lens which needs to perform the magnification processing, based on the information indicating the part number obtained from interchangable lens 100B. However, the information indicating the magnitude of the image magnification change of interchangable lens 100B is, for example, a flag indicating interchangable lens 100B which needs to perform the magnification processing during the depth synthesis processing. This flag may be stored in built-in memory 420 of interchangable lens 100B. In this case, when interchangable lens 100B is attached to camera main body 100A or when the depth synthesis processing is performed, camera main body controller 180A may obtain the flag from built-in memory 420 of interchangable lens 100B, and decide whether interchangable lens 100B is an interchangable lens which needs to perform the magnification processing, based on the flag.

(3) In the above exemplary embodiments, depth synthesis is performed by using frame images which configure multifocus moving images. However, the depth synthesis may be performed by using a plurality of still images generated by continuous shooting instead of frame images which configure moving images.

(4) In the above exemplary embodiments, a digital camera has been described as an example of an imaging device. However, the imaging device is not limited to this. An idea of the present disclosure is applicable to various imaging devices such as digital video cameras, smartphones, and wearable cameras which can shoot moving images.

(5) In the above exemplary embodiments, an imaging sensor is configured as a CCD, yet the imaging sensor is not limited to this. The imaging sensor may be configured as an n-channel metal-oxide semiconductor (NMOS) image sensor or a complementary metal-oxide semiconductor (CMOS) image sensor.

Figure 25:
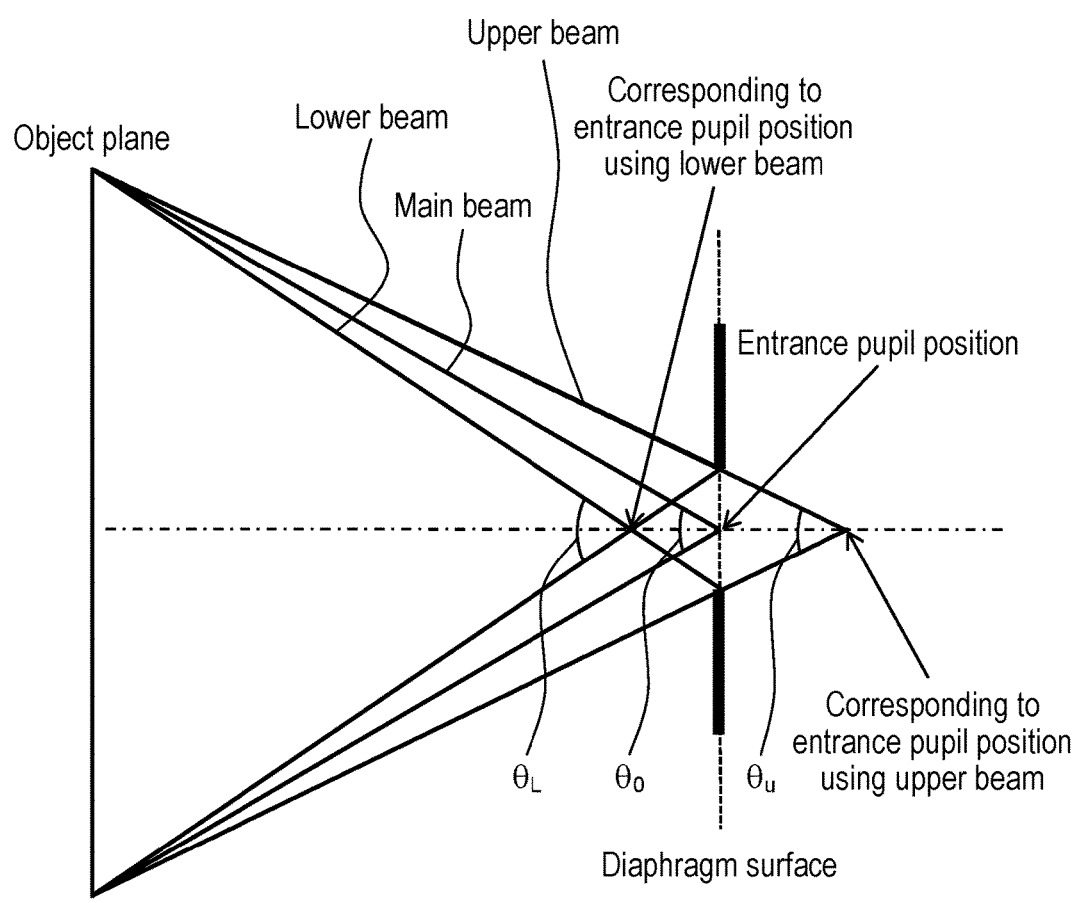
FIG. 25 is a view illustrating angles of view of a main beam, an upper beam and a lower beam.

(6) In the above exemplary embodiments, an angle of view determined based on an entrance pupil position of a main beam as illustrated in FIG. 16 has been described. However, the angle of view is not limited to this. As long as complexity is permitted, as illustrated in FIG. 25, an image magnification may be calculated based on angle of view $\theta_L$ determined based on an entrance pupil position by using an upper beam or angle of view $\theta_L$ determined based on an entrance pupil position by using a lower beam. Further, an angle of view ($\theta_U$ to $\theta_L$) determined in a range of each beam of a main beam, an upper beam and a lower beam may be used.

(7) In the above exemplary embodiments, 49 (7 rows×7 columns) AF regions have been described as an example of AF regions. However, the AF regions are not limited to these. As long as an increase in a processing load and complexity are permitted, 100 AF regions may be used, or small AF regions are used at an optical axis center portion, and larger AF regions than the AF regions at the optical axis center portion may be used at optical axis surrounding portions. Hence, the number of AF regions, and a shape and a size of each AF region are not limited to these.

(8) In the above exemplary embodiments, controller 180 finds an in-focus position per AF region by detecting a contrast value per AF region while moving focus lens 111 in an entire range from a near end to an infinity end (or vice versa). However, focus lens 111 is not necessarily moved in the entire range from the near end to the infinity end (or vice versa). Focus lens 111 may be moved from the near end to the infinity side (or from the infinity end to the near side) to detect a contrast value per AF region, and focus search may be finished at a point of time at which in-focus positions of all AF regions are found before focus lens 111 is moved to the infinity end (or the near end). Consequently, a time required for focus serge can be reduced.

(9) In the above exemplary embodiments, an in-focus position is found by detecting a contrast value. However, detection of the in-focus position is not limited to this. A phase difference, an image surface phase difference, and Depth from Defocus (DFD) may be used and may be combined as long as complexity is permitted.

As described above, the exemplary embodiments have been described to exemplify the technique disclosed in the present disclosure. For this reason, accompanying drawings and detail description are provided. Therefore, the components described in the accompanying drawings and the detailed description include not only the components essential for solving the problem but also components that are not essential for solving the problem in order to illustrate the techniques. For this reason, even if these unessential components are described in the accompanying drawings and the detailed description, these unessential components should not be immediately approved as being essential. Further, since the above exemplary embodiments illustrate the technique in the present disclosure, various modifications, substitutions, additions and omissions can be performed within the scope of claims and equivalent scope of claims.

The present disclosure is applicable to an imaging device that can capture still images and moving images. More specifically, the present disclosure is applicable to various imaging devices such as digital cameras, digital video cameras, smartphones, wearable cameras and monitoring cameras which can capture still images or moving images.

What is claimed is:

1. An imaging device comprising:
an imaging sensor that includes an imaging plane, picks up a object image and generates a plurality of pieces of image data;
an optical system that includes a focus lens movable along an optical axis, is configured to form the object image on the imaging plane, and changes an image magnification of the object image formed on the imaging plane according to a position of the focus lens; and
a controller that causes the imaging sensor to generate the plurality of pieces of image data by causing the imaging sensor to pick up the object image while moving the focus lens to generate still image data greater in a depth of field than the plurality of pieces of image data based on the plurality of pieces of image data,
wherein
when generating the still image data, the controller
finds an entrance pupil position of the optical system based on the position of the focus lens for each of the plurality of pieces of image data to calculate an image magnification change rate indicating a change of the image magnification of the object image based on the found entrance pupil position,
magnifies each of the plurality of pieces of image data such that a size of the object image indicated by each of the plurality of pieces of image data becomes a predetermined size, based on the corresponding image magnification change rate, and
synthesizes the plurality of pieces of magnified image data to generate the still image data.

2. An imaging device comprising:
an imaging sensor that includes an imaging plane, picks up a object image and generates a plurality of pieces of image data;
an optical system that includes a focus lens movable along an optical axis, is configured to form the object image on the imaging plane, and changes an image magnification of the object image formed on the imaging plane according to a position of the focus lens; and
a controller that causes the imaging sensor to generate the plurality of pieces of image data by causing the imaging sensor to pick up the object image while moving the focus lens to generate still image data greater in a depth of field than the plurality of pieces of image data based on the plurality of pieces of image data, wherein when generating the still image data, the controller
- calculates an angle of view of the optical system based on the position of the focus lens for each of the plurality of pieces of image data to calculate an image magnification change rate indicating a change of the image magnification of the object image based on the calculated angle of view,
- magnifies each of the plurality of pieces of image data such that a size of the object image indicated by each of the plurality of pieces of image data becomes a predetermined size, based on the corresponding image magnification change rate, and
- synthesizes the plurality of pieces of magnified image data to generate the still image data.

3. The imaging device according to claim 1, wherein when magnifying the plurality of pieces of image data, the controller magnifies a rest of pieces of image data in an enlargement direction based on image data of a highest image magnification change rate among the plurality of pieces of image data.

4. The imaging device according to claim 1, wherein when magnifying the plurality of pieces of image data, the controller magnifies a rest of pieces of image data in a reduction direction based on image data of a lowest image magnification change rate among the plurality of pieces of image data.

5. The imaging device according to claim 1, wherein when a first object, which is focused when the focus lens is at a first focus lens position, and a second object, which is focused when the focus lens is at a second focus lens position, are present as a object, the controller calculates the image magnification change rate by using an intermediate position between the first focus lens position and the second focus lens position as the position of the focus lens.

6. The imaging device according to claim 1, further comprising:
- a camera main body; and
- an interchangable lens that is the optical system and is detachable from the camera body, wherein the camera main body includes the controller and a storage, the storage stores information about the interchangable lens, the information indicating a magnitude of an image magnification change indicating whether the image magnification change rate in case where the focus lens is moved in a predetermined range along the optical axis is a predetermined value or more, and the controller obtains the information about the interchangable lens attached to the camera main body, and magnifies the plurality of pieces of image data when deciding that the information indicates that the image magnification change rate is the predetermined value or more.

7. The imaging device according to claim 2, wherein when magnifying the plurality of pieces of image data, the controller magnifies a rest of pieces of image data in an enlargement direction based on image data of a highest image magnification change rate among the plurality of pieces of image data.

8. The imaging device according to claim 2, wherein when magnifying the plurality of pieces of image data, the controller magnifies a rest of pieces of image data in a reduction direction based on image data of a lowest image magnification change rate among the plurality of pieces of image data.

9. The imaging device according to claim 2, wherein when a first object, which is focused when the focus lens is at a first focus lens position, and a second object, which is focused when the focus lens is at a second focus lens position, are present as a object, the controller calculates the image magnification change rate by using an intermediate position between the first focus lens position and the second focus lens position as the position of the focus lens.

10. The imaging device according to claim 2, further comprising:
- a camera main body; and
- an interchangable lens that is the optical system and is detachable from the camera body, wherein the camera main body includes the controller and a storage, the storage stores information about the interchangable lens, the information indicating a magnitude of an image magnification change indicating whether the image magnification change rate in case where the focus lens is moved in a predetermined range along the optical axis is a predetermined value or more, and the controller obtains the information about the interchangable lens attached to the camera main body, and magnifies the plurality of pieces of image data when deciding that the information indicates that the image magnification change rate is the predetermined value or more.

* * * * *